US012726263B2

(12) United States Patent
Yoshida

(10) Patent No.: US 12,726,263 B2
(45) Date of Patent: Sep. 1, 2026

(54) SATELLITE SIGNAL RECEPTION APPARATUS, SATELLITE SIGNAL SELECTION METHOD, AND PROGRAM

(71) Applicant: NTT, Inc., Tokyo (JP)

(72) Inventor: Seiji Yoshida, Tokyo (JP)

(73) Assignee: NTT, Inc., Tokyo (JP)

( * ) Notice: Subject to any disclaimer, the term of this patent is extended or adjusted under 35 U.S.C. 154(b) by 292 days.

(21) Appl. No.: 18/722,226

(22) PCT Filed: Sep. 14, 2022

(86) PCT No.: PCT/JP2022/034447
§ 371 (c)(1),
(2) Date: Jun. 20, 2024

(87) PCT Pub. No.: WO2023/135863
PCT Pub. Date: Jul. 20, 2023

(65) Prior Publication Data
US 2025/0055558 A1 Feb. 13, 2025

(51) Int. Cl.
*H04B 7/185* (2006.01)

(52) U.S. Cl.
CPC ................................ *H04B 7/18513* (2013.01)

(58) Field of Classification Search
CPC ...... H04B 7/18513; G01S 19/22; G01S 19/28
See application file for complete search history.

(56) References Cited

U.S. PATENT DOCUMENTS 6,320,536 B1 * 11/2001 Sasaki .................. G01S 19/235 342/357.68
2021/0239846 A1 * 8/2021 Yoshida ................. G04R 20/06
2022/0018971 A1 * 1/2022 Bennington ............ G01S 19/06
(Continued)

FOREIGN PATENT DOCUMENTS

| | | |
|---|---|---|
| JP | 2005-069729 | 3/2005 |
| JP | 2008-045896 | 2/2008 |
| JP | 2020-201282 | 12/2020 |

OTHER PUBLICATIONS

Seiji Yoshida et al., "Improvement of the time synchronization precision in the multipath satellite signal reception environment by an algorithm for statistical satellite signals selection applied in the GPS receiver", IEICE Technical Report, Feb. 16, 2017.
(Continued)

*Primary Examiner* — Fayyaz Alam
(74) *Attorney, Agent, or Firm* — IPUSA, PLLC

(57) ABSTRACT

A satellite signal reception apparatus includes: a signal selection unit that selects a predetermined number of satellite signals based on reception qualities of satellite signals received by a GNSS antenna; and a measurement unit that executes positioning by using the predetermined number of satellite signals selected by the signal selection unit and determines an initial estimated position, in which the signal selection unit selects a plurality of satellite signals to be used for positioning or time synchronization based on a comparison result obtained by comparing a reception time expected in a case where a satellite signal is received as a direct wave at the initial estimated position with an actual reception time of the satellite signal.

7 Claims, 23 Drawing Sheets

(56) References Cited

U.S. PATENT DOCUMENTS

| | | | | |
|---|---|---|---|---|
| 2023/0026875 | A1* | 1/2023 | Ignatiev | G01S 19/44 |
| 2024/0069213 | A1* | 2/2024 | Caparra | G06N 3/006 |

OTHER PUBLICATIONS

Tsukagoshi et al., "Localization for Autonomous Navigation of a Mobile Robot Using an Open Source GNSS Library in Pedestrian Environments" Transactions of the Society of Instrument and Control Engineers vol. 52, No. 5, 276/283 (2016).

* cited by examiner

Fig. 6

SETTING PARAMETERS

| SETTING VALUE | NUMERICAL VALUE | UNIT | DESCRIPTION |
| --- | --- | --- | --- |
| $CN_{0max}$ | POSITIVE REAL NUMBER | dB-Hz | MAXIMUM VALUE OF $C/N_0$ OF ALL RECEIVED SATELLITE SIGNALS IN L1 BAND |
| $dCN_0$ | POSITIVE REAL NUMBER | dB | PARAMETER THAT DETERMINES RANGE OF SATELLITE SIGNAL SELECTION |
| $N_0$ | POSITIVE INTEGER | – | NUMBER OF SELECTED SATELLITE SIGNALS |

Fig. 7

EXAMPLE OF SETTING OF GNSS BIAS VALUES (REAL VALUES)

| GNSS | GPS | GLO | Galileo | BeiDou | QZSS |
|---|---|---|---|---|---|
| BIAS VALUE (dB) | 0 | +2 | +3 | +2 | −1 |

Fig. 8

EXAMPLE OF SETTING OF ELEVATION BIAS VALUES (REAL NUMBERS)

| ELEVATION | 0 | 10 | 20 | 30 | 40 | 50 | 60 | 70 | 80 | 90 |
|---|---|---|---|---|---|---|---|---|---|---|
| BIAS VALUE (dB) | +5 | +5 | +4 | +4 | +3 | +3 | +2 | +2 | +1 | 0 |

Fig. 9

EXAMPLE OF SETTING OF GNSS PRIORITY ORDERS

| GNSS | GPS | GLO | Galileo | BeiDou | QZSS |
|---|---|---|---|---|---|
| PRIORITY ORDER | 1 | 5 | 3 | 4 | 2 |

Fig. 18

SETTING PARAMETERS

| SETTING VALUE | NUMERICAL VALUE | UNIT | DESCRIPTION |
|---|---|---|---|
| $CN_{0L1}$ | POSITIVE REAL NUMBER | dB-Hz | MINIMUM $C/N_0$ VALUE OF SELECTED SATELLITE IN L1 BAND |
| $CN_{0L2}$ | POSITIVE REAL NUMBER | dB-Hz | MINIMUM $C/N_0$ VALUE OF SELECTED SATELLITE IN L2 BAND |
| $dCN_{0L1}$ | POSITIVE REAL NUMBER | dB | PARAMETER THAT DETERMINES RANGE OF SATELLITE SIGNAL SELECTION IN L1 BAND |
| $dCN_{0L2}$ | POSITIVE REAL NUMBER | dB | PARAMETER THAT DETERMINES RANGE OF SATELLITE SIGNAL SELECTION IN L2 BAND |
| $N_{0L1}$ | POSITIVE INTEGER | – | NUMBER OF SELECTED SATELLITES IN L1 BAND |
| $N_{0L2}$ | POSITIVE INTEGER | – | NUMBER OF SELECTED SATELLITES IN L2 BAND |

B
1004
CPU
1005
INTERFACE DEVICE
1006
DISPLAY DEVICE
1007
INPUT DEVICE
1000
DRIVE DEVICE
1002
AUXILIARY STORAGE DEVICE
1003
MEMORY DEVICE
1008
OUTPUT DEVICE
1001
RECORDING MEDIUM

SATELLITE SIGNAL RECEPTION APPARATUS, SATELLITE SIGNAL SELECTION METHOD, AND PROGRAM

TECHNICAL FIELD

The present invention relates to technology for performing positioning and time synchronization by a global navigation satellite system (GNSS) with high accuracy.

BACKGROUND ART

In recent years, positioning and time synchronization by GNSS have been utilized in a wide range of applications.

In positioning and time synchronization by GNSS, processing of positioning and time synchronization is executed by using a GNSS satellite signal (hereinafter, a satellite signal) received by a GNSS antenna.

There is a case where reception of a satellite signal in a line-of-sight state is blocked by a structure or the like present around an installation position of the GNSS antenna. In that case, the satellite signal is not received having a signal intensity required by the GNSS antenna, or is received as an invisible satellite signal by multipath in which the signal is reflected and diffracted by the structure or the like present around the installation position of the GNSS antenna.

As a result, positioning performance and time synchronization performance by GNSS deteriorate.

CITATION LIST

Non Patent Literature

Non Patent Literature 1: Tsukagoshi et al., "Localization for Autonomous Navigation of a Mobile Robot Using an Open Source GNSS Library in Pedestrian Environments" Transactions of the Society of Instrument and Control Engineers Vol. 52, No. 5, 276/283 (2016)

SUMMARY OF INVENTION

Technical Problem

To improve accuracy of positioning and time synchronization by GNSS, it is important to receive a large number of visible satellite signals that can be received in a line-of-sight state, and effectively exclude invisible satellite signals that cannot be received in a line-of-sight state and greatly affect deterioration in accuracy, from satellite signals used in positioning and time synchronization.

The present invention has been made in view of the above point, and an object of the present invention is to provide technology that makes it possible to appropriately select satellite signals, and perform positioning and time synchronization by GNSS with high accuracy even in a case where a reception environment of satellite signals is not good.

Solution to Problem

According to the disclosed technology, there is provided a satellite signal reception apparatus including:

a signal selection unit that selects a predetermined number of satellite signals based on reception qualities of satellite signals received by a GNSS antenna; and a measurement unit that executes positioning by using the predetermined number of satellite signals selected by the signal selection unit and determines an initial estimated position, in which the signal selection unit selects a plurality of satellite signals to be used for positioning or time synchronization based on a comparison result obtained by comparing a reception time expected in a case where a satellite signal is received as a direct wave at the initial estimated position with an actual reception time of the satellite signal.

Advantageous Effects of Invention

According to the disclosed technology, there is provided a technology that makes it possible to perform positioning and time synchronization by GNSS with high accuracy even in a case where a reception environment of satellite signals is not good.

BRIEF DESCRIPTION OF DRAWINGS

FIG. 6 is a diagram illustrating an example of setting parameters.

FIG. 7 is a diagram illustrating an example of settings of GNSS bias values.

FIG. 8 is a diagram illustrating an example of settings of elevation bias values.

FIG. 9 is a diagram illustrating an example of settings of GNSS priority orders.

FIG. 18 is a diagram illustrating an example of setting parameters.

DESCRIPTION OF EMBODIMENTS

Figure 1:
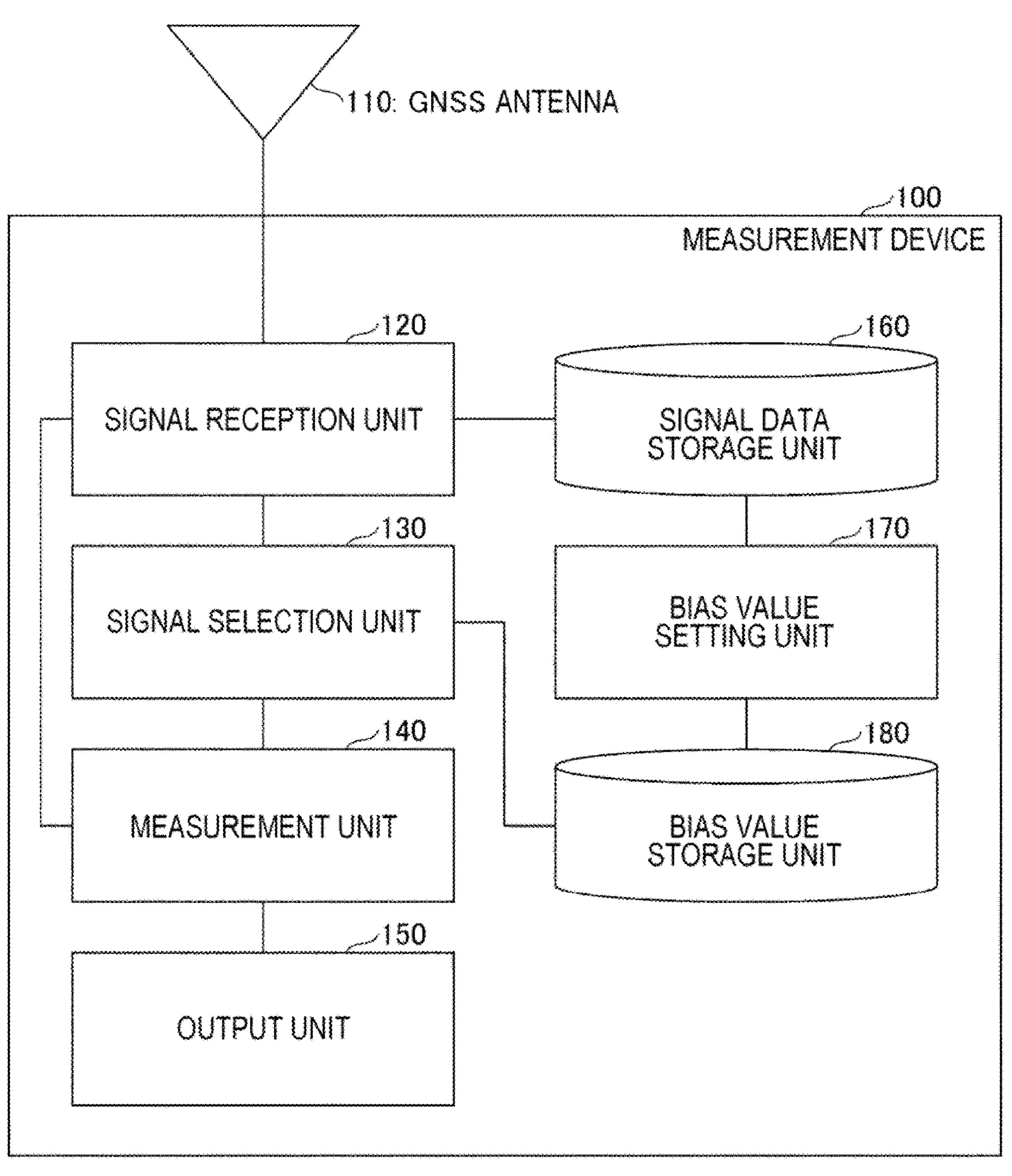
FIG. 1 is a configuration diagram of a measurement device in an embodiment of the present invention.

Hereinafter, embodiments of the present invention (present embodiments) will be described with reference to the drawings. The embodiments described below are merely examples, and embodiments to which the present invention is applied are not limited to the following embodiments.

Details of Problem and Overview of Embodiments

In recent years, GLONASS, Galileo, BeiDou, QZSS, NAVIC, and the like have been available as navigation satellite systems other than GPS, and the number of satellites has increased.

As described above, to improve the accuracy of positioning and time synchronization by GNSS, it is important to receive a large number of visible satellite signals that can be received in a line-of-sight state, and effectively exclude invisible satellite signals that cannot be received in a line-of-sight state and that greatly affect deterioration in accuracy, from satellite signals used in positioning and time synchronization.

As a conventional method for excluding invisible satellite signals, a carrier-to-noise power density ($C/N_0$) mask method is known in which satellite signals having $C/N_0$ values less than or equal to a preset threshold are excluded from received satellite signals.

However, since a $C/N_0$ value of a satellite signal depends on a gain of an antenna, reception sensitivity of a receiver, a cable loss between the antenna and the receiver, a satellite type, and the like, it is difficult to set an optimum threshold.

Furthermore, in the $C/N_0$ mask method, in a case where an interference signal is mixed in a signal bandwidth of satellite signals, $C/N_0$ values of the satellite signals decrease as a whole, and the satellite signals are lost by the $C/N_0$ mask, and as a result, there is a risk that positioning and time synchronization cannot be performed. Examples of such an interference signal include noise generated by a device and an interference signal from another communication system in addition to a GNSS jamming (interruption) signal intentionally generated.

In the present embodiments, to receive a large number of visible satellite signals that can be received in a line-of-sight state, and effectively exclude invisible satellite signals that cannot be received in a line-of-sight state and that greatly affect deterioration in accuracy, from satellite signals used in positioning and time synchronization, satellite signals suitable for use in positioning and time synchronization are selected in a procedure to be described later in which a multi-GNSS environment is assumed where a large number of visible satellites can be secured. This procedure can select satellite signals in which influences of individual characteristics of the antenna and the receiver and the interference signal are excluded although an intensity (a reception quality) of a received satellite signal is used as a basis of selection.

Furthermore, in this procedure, visible satellite signals are preferentially selected, and in a case where the number of visible satellites is small, an invisible satellite having a small propagation delay and having a small influence on accuracy deterioration is selected in addition to the visible satellites.

Hereinafter, examples of a configuration and operation in the embodiments of the present invention will be described in detail. Note that, in processing described below, a $C/N_0$ value is used as an index of the reception quality, but an index of the reception quality other than the $C/N_0$ value may be used. Furthermore, in the present embodiments, a "satellite signal" in "selecting a satellite signal" is associated with a GNSS satellite that is a transmission source of the satellite signal. For example, assuming that a GNSS satellite A, a GNSS satellite B, and a GNSS satellite C are any three different GNSS satellites, selecting three satellite signals indicates selecting a satellite signal from the GNSS satellite A, a satellite signal from the GNSS satellite B, and a satellite signal from the GNSS satellite C.

Device Configuration

FIG. 1 illustrates an example of a configuration of a measurement device 100 in the embodiments of the present invention. The measurement device 100 in the present embodiments includes a GNSS antenna 110, a signal reception unit 120, a signal selection unit 130, a measurement unit 140, an output unit 150, a signal data storage unit 160, a bias value setting unit 170, and a bias value storage unit 180. Note that the measurement device 100 is a device that receives and processes a satellite signal, and may be referred to as a "satellite signal reception apparatus".

The GNSS antenna 110 receives a radio wave transmitted from a GNSS satellite on an orbit, and converts the radio wave into an electric signal. The electric signal may be referred to as a "satellite signal".

The GNSS antenna 110 and the signal reception unit 120 are connected to each other by a cable, and the satellite signal is sent to the signal reception unit 120 by the cable. In a case where a distance between the GNSS antenna 110 and the signal reception unit 120 is long, an amplifier may be provided between the GNSS antenna 110 and the signal reception unit 120.

The signal reception unit 120 receives the satellite signal, measures a $C/N_0$ value, and identifies a type of a GNSS satellite that is a transmission source of the received satellite signal. Furthermore, an elevation is measured by using orbit information on the satellite (for example, almanac and ephemeris). The orbit information on the satellite may be acquired from a navigation message of the satellite signal, or may be acquired from another means (for example, a server on a network). The signal reception unit 120 sends identification information (a code such as a PRN number) on the received satellite signal, the elevation, the $C/N_0$ value, and the satellite type of the satellite signal to the signal selection unit 130. Furthermore, the signal reception unit 120 stores the identification information, the elevation, the $C/N_0$ value, and the satellite type for each of received satellite signals in the signal data storage unit 160. Note that the elevation is an angle formed by a line of sight and a horizontal plane in a case where a GNSS satellite that is a transmission source of a satellite signal is viewed from a reception point of the satellite signal (that is, the GNSS antenna). For example, in a case where the GNSS satellite is at the zenith, its elevation is 90°.

Types of GNSS satellites to be targeted in the present embodiments are GPS, GLONASS, Galileo, BeiDou, QZSS, and NAVIC. However, these are examples, and may be more or less than these types.

The signal selection unit 130 selects a satellite signal to be used for positioning and time synchronization from a plurality of received satellite signals. A selection procedure will be described later.

The measurement unit 140 performs time synchronization using a satellite signal transmitted from a GNSS satellite equipped with an atomic clock in which time is precisely managed with respect to the absolute time, thereby calculating time information in which time synchronization is performed with high accuracy with respect to the absolute time. The absolute time here is, for example, coordinated universal time (UTC). Note that the measurement unit 140 may perform only one of positioning and time synchronization.

From a received satellite signal, the absolute time when the satellite signal is transmitted from the GNSS satellite can be known; however, accurate absolute time cannot be obtained at a reception position unless a propagation time until the satellite signal reaches a position of the GNSS antenna 110 from the GNSS satellite is measured and a time offset value $\Delta t$ between a time of the measurement unit 140 and a time of the satellite is corrected.

Thus, the measurement unit 140 performs positioning and time synchronization at the same time by calculating, by code positioning, four parameters of three-dimensional coordinate information (x, y, z) of the reception position and the time offset ($\Delta t$), for example, using satellite signals from four or more GNSS satellites. The measurement unit 140 may perform carrier phase positioning (interference positioning) in addition to the code positioning.

The measurement unit 140 outputs the time information based on the absolute time and position information that is a positioning result via the output unit 150. For example, assuming that the measurement device 100 is a base station in a mobile network, the base station uses the time information synchronized with the absolute time, and for example, matches a time slot configuration (arrangement) of uplink and downlink signals of TDD signal frames with that of an adjacent base station (synchronized with the absolute time), and then synchronizes transmission timings of the signal frames with each other, thereby being able to transmit a time division duplex (TDD) signal not to interfere with the adjacent base station.

The bias value setting unit 170 sets (calculates) a bias value by using satellite signal data stored in the signal data storage unit 160, and stores the set bias value in the bias value storage unit 180. The bias value stored in the bias value storage unit 180 is used for satellite signal selection processing in the signal selection unit 130. Details of a bias value setting operation by the bias value setting unit 170 will be described later.

The measurement device 100 in the present embodiments may be one physically integrated device, or may be a device in which some functional units are physically separated from each other and a plurality of the separated functional units is connected together by a network.

Furthermore, the measurement device 100 may include all functions illustrated in FIG. 1, or some of the functions (for example, the signal selection unit 130 and the measurement unit 140) may be provided on a network (for example, on a cloud), and the rest of the functions may be installed in the measurement device 100 and used.

For example, satellite signal selection and positioning calculation may be performed on a cloud by outputting observation data from the signal reception unit 120 included in the measurement device 100 and transmitting the observation data to a device including "the signal selection unit 130 and the measurement unit 140" provided on the cloud. In this case, a positioning calculation result is returned from the measurement unit 140 on the cloud to the output unit 150.

Furthermore, a device including "the signal data storage unit 160 and the bias value setting unit 170" in the measurement device 100 may be provided on a network (for example, on a cloud), and the rest of the functions may be installed in the measurement device 100 and used.

For example, observation data is output from the signal reception unit 120 included in the measurement device 100, and the observation data is stored in the signal data storage unit 160 provided on the cloud, and the bias value setting unit 170 provided on the cloud sets the bias value by using the stored data. In this case, the bias value is returned from the bias value setting unit 170 on the cloud to the bias value storage unit 180.

[Processing Content for Satellite Signal Selection]

Next, an operation of the measurement device 100 for satellite signal selection (particularly, operations of the signal selection unit 130 and the measurement unit 140) will be described. The measurement device 100 performs the satellite signal selection processing in an order of (1) initial estimated position determination processing, (2) satellite selection processing, and (3) substitute satellite selection processing. An overview of pieces of processing is as described below.

(1) The initial estimated position determination processing is processing of determining an initial estimated position to be a reference in performing satellite selection.

(2) The satellite selection processing is processing of selecting a non line of sight (NLOS) satellite signal having a small delay in addition to a line of sight (LOS) satellite signal by comparing an estimated reception time at the initial estimated position with an actual reception time.

(3) The substitute satellite selection processing is processing of additionally selecting a satellite to suppress deterioration of positioning and time synchronization accuracy due to deterioration of a dilution of precision (DOP) value in a case where the number of the selected satellite signals is small.

Hereinafter, (1) the initial estimated position determination processing, (2) the satellite selection processing, and (3) the substitute satellite selection processing will be described with reference to flowcharts.

Symbols of parameters used here have the following meanings. Note that a specific example of the satellite signal selection processing in the initial estimated position determination processing will be described later, but parameters used in the specific example will be described again in the specific example.

$dCN_0$: Maximum value of differences between the maximum value of $C/N_0$ values of received satellite signals and $C/N_0$ values of satellite signals selected in initial estimated position processing $N_0$: Minimum number of the satellite signals selected in initial estimated position determination processing dT: Threshold of the delay time from the reception time expected at initial estimated position in satellite selection processing $N_s$: Maximum number of times of updating the initial estimated position in satellite selection processing dp: Threshold of a difference between the initial estimated positions before and after update for completion determination in the satellite selection processing $N_1$: Minimum number of the satellite signals selected in the substitute satellite selection processing <(1) Initial Estimated Position Determination Processing>

Figure 2:
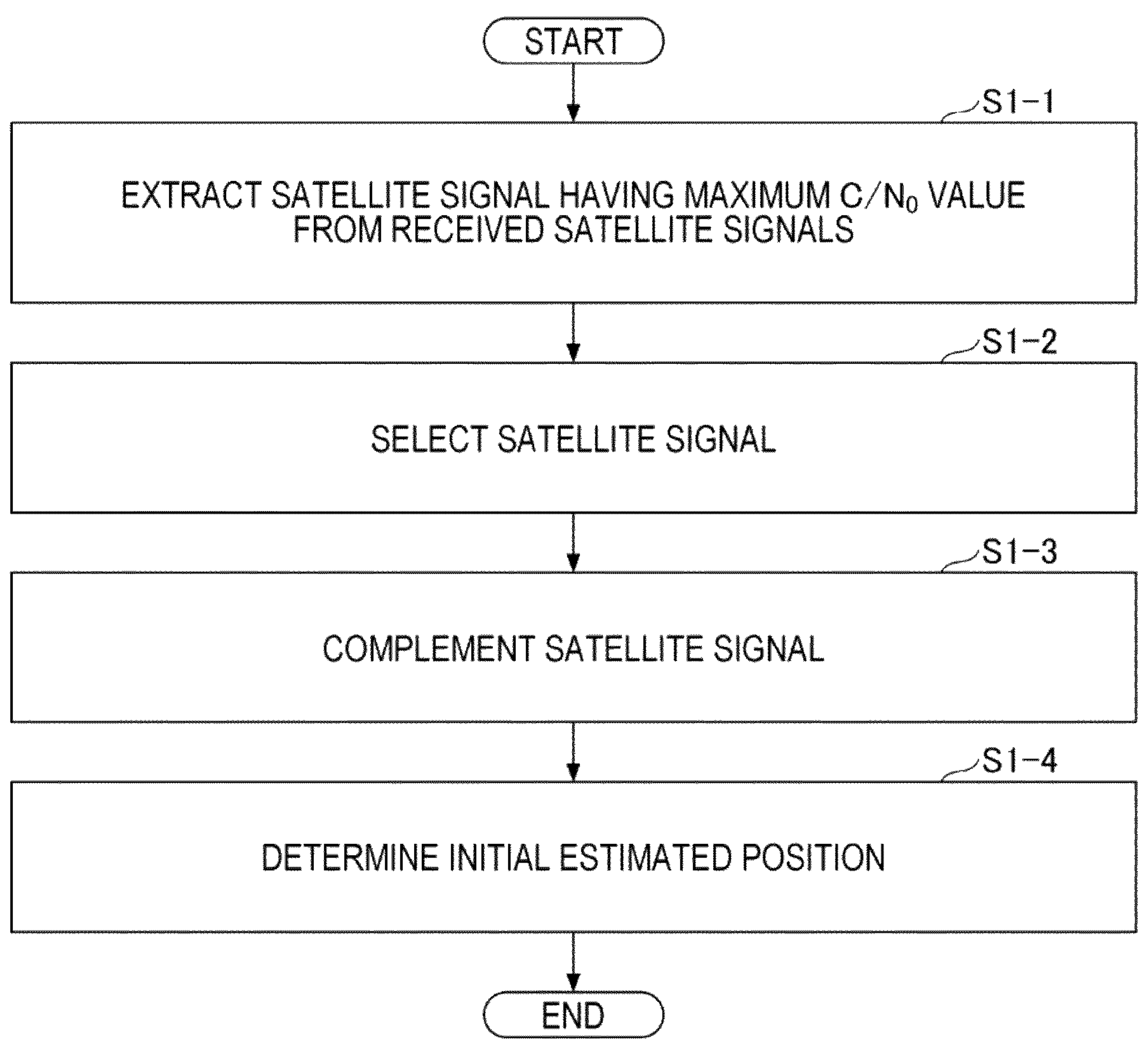
FIG. 2 is a flowchart of initial estimated position determination processing.

The initial estimated position determination processing will be described with reference to a flowchart of FIG. 2.

In S1-1, the signal selection unit 130 extracts a satellite signal having a maximum $C/N_0$ value from a plurality of satellite signals received by the signal reception unit 120.

In S1-2, the signal selection unit 130 selects, from the plurality of satellite signals, a satellite signal in which a difference between the $C/N_0$ value and the maximum $C/N_0$ value extracted in S1-1 is less than or equal to a preset value ($dCN_0$).

In S1-3, in a case where the number of satellite signals selected in S1-1 and S1-2 is less than a preset minimum number of the satellite signals ($N_0$), the signal selection unit 130 complements the satellite signals with satellite signals from a satellite signal having a large (the second largest) $C/N_0$ value until a minimum number of the satellite signals ($N_0$) is reached.

In S1-4, the measurement unit 140 determines an initial estimated position of the measurement device 100 by code positioning using the satellite signals selected in S1-1 to S1-3. Note that, as the positioning method, a positioning method other than the code positioning may be used. The same applies to a step of performing the code positioning in the subsequent processing.

Note that S1-1 to S1-3 will be described later with more detailed examples as a first embodiment and a second embodiment.

<(2) Satellite Selection Processing>

Figure 3:
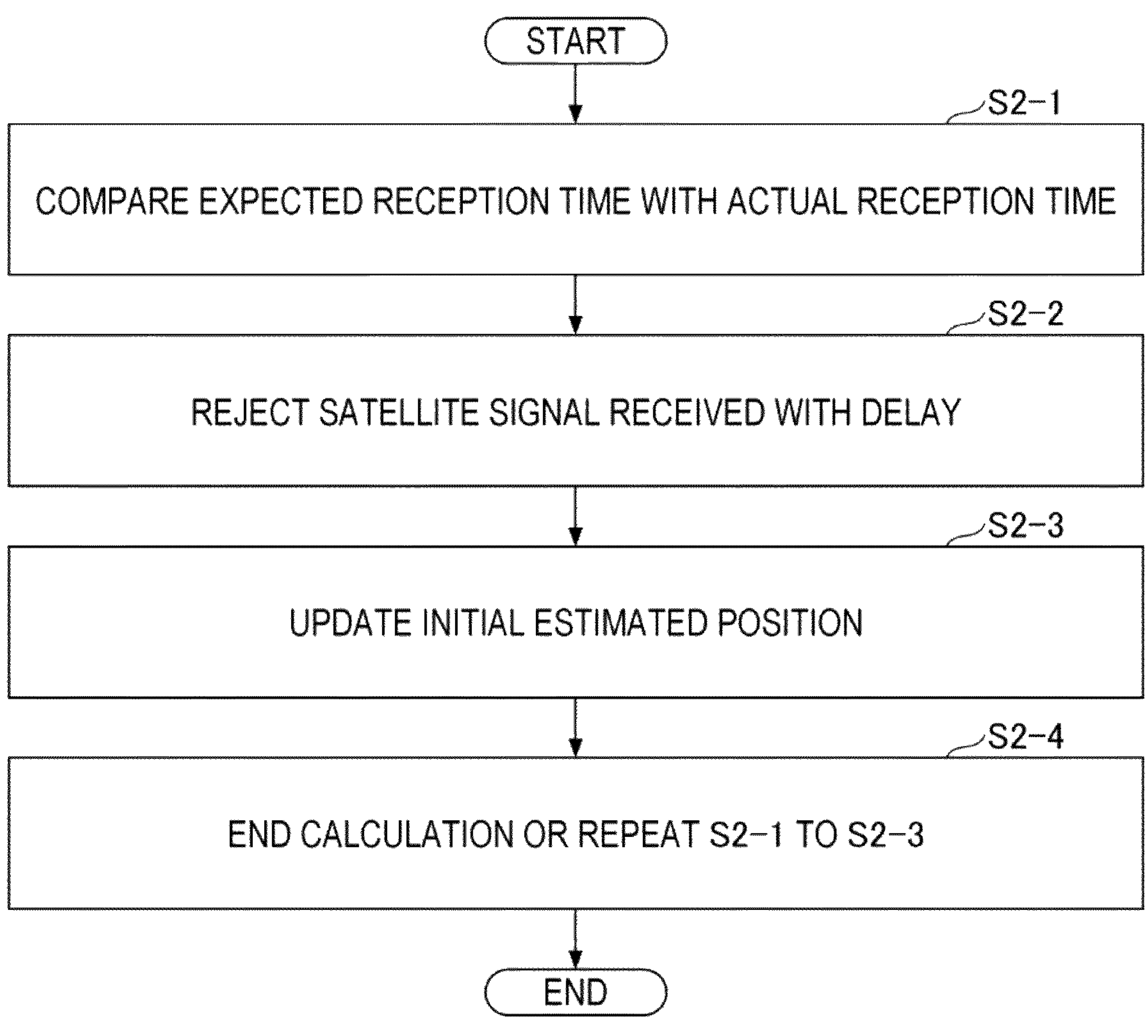
FIG. 3 is a flowchart of satellite selection processing.

Next, the satellite selection processing will be described with reference to a flowchart of FIG. 3.

In S2-1, on a premise that a clock bias of a receiver (the measurement device 100) and a time bias between satellite systems are corrected in a process of the code positioning in S1-4, the signal selection unit 130 compares a reception time expected in a case where each satellite signal is received as a direct wave by the signal reception unit 120 at the initial estimated position with an actual reception time.

The reception time expected in the case where the satellite signal is received as the direct wave can be calculated from a straight line distance between a satellite position that is a transmission source of the satellite signal calculated from orbit information and the initial estimated position. The actual reception time may be measured by any of the signal reception unit 120, the signal selection unit 130, and the measurement unit 140.

In S2-2, the signal selection unit 130 rejects a satellite signal received with a time delay of greater than or equal to dT from a reception time at the initial estimated position at which the actual reception time is expected, by comparison in S2-1.

For example, dT is set as X [ns]. Assuming that an expected reception time of a satellite signal A is T and an actual reception time of the satellite signal A is T+X+1 [ns], the satellite signal A is rejected because the delay time is X+1 (greater than or equal to dT).

In S2-3, the measurement unit 140 performs the code positioning with a plurality of satellite signals received by the signal reception unit 120 except the satellite signal rejected in S2-2, and updates the initial estimated position of the measurement device 100 with the obtained coordinate value.

In S2-4, in a case where any one of three cases of (1) to (3) is satisfied, the calculation is ended, in which the three cases are (1) a case where the number of the satellite signals selected in S2-3 is less than four (in other words, in a case where the number of the selected satellites is less than four), (2) a case where a vector difference between the initial estimated positions before and after the update is less than or equal to a preset value (dp), and (3) a case where a preset number of calculations ($N_s$) is reached. In a case where none of (1) to (3) are satisfied, S2-1 to S2-3 are repeated. Note that conditions for ending the calculation are not limited to (1) to (3).

Regarding the above (2), for example, in a case where a position after the n-th update of the initial estimated position is $x_n$ (a vector representing a position) and a position after the (n+1)-th update of the initial estimated position is $x_{n+1}$, if $|x_n - x_{n+1}|$ is less than or equal to dp[m], the calculation is ended.

In repetitive processing of S2-1 to S2-3, the dT value may be decreased for each repetition. For example, dT=X [ns] may be set in the first calculation of S2-2, and dT=X−(n−1)×Δ(Δ is a positive real number, where dT>0 is defined) may be set in the n-th (n is an integer greater than or equal to 2) calculation of S2-2. With such processing, since dT decreases for each repetition, the number of the rejected satellite signals increases, and a satellite signal having a small delay from the expected reception time is more easily selected.

<(3) Substitute Satellite Selection Processing>

Figure 4:
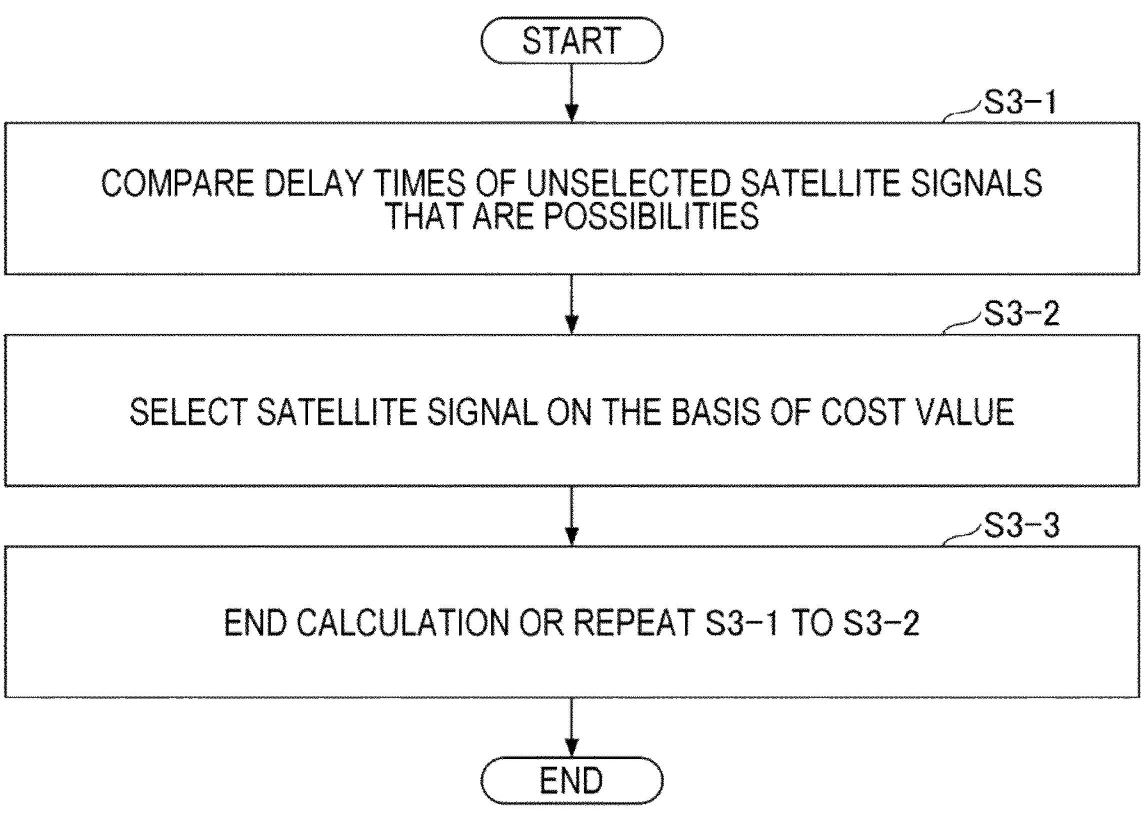
FIG. 4 is a flowchart of substitute satellite selection processing.

Next, the substitute satellite selection processing will be described with reference to a flowchart of FIG. 4.

In S3-1, in a case where the number of the satellite signals selected at a point of time of calculation end in S2-4 is less than a preset number ($N_1$), in order to select a substitute satellite signal to be supplemented to reach the preset number, the signal selection unit 130 compares delay times with each other among a plurality of unselected satellite signals that are selection possibilities. The delay time is "a difference between a reception time expected in a case where a satellite signal is received as a direct wave at the initial estimated position and an actual reception time" to be compared with dT in S2-2. For the delay time of each unselected satellite signal, a value measured and calculated in S2-2 at the end of the repetition may be used, or a value newly measured and calculated at S3-1 by using the initial estimated position at the point of time of calculation end in S2-4 may be used.

In S3-2, the signal selection unit 130 performs comparison of DOP values in cases where a satellite signal having a minimum delay time and a satellite signal having a next minimum delay time in S3-1 are added to the satellite signals selected at the point of time of calculation end in S2-4, and selects a satellite signal having a smaller cost value calculated by the delay time and the DOP value as the satellite signal to be added.

For example, it is assumed that the satellite signal A, a satellite signal B, and a satellite signal C are selected at the point of time of calculation end of S2-4. In S3-2, it is assumed that a satellite signal D is selected as the satellite signal having the minimum delay time, and a satellite signal E is selected as the satellite signal having the next minimum delay time.

Here, it is assumed that a delay time of the satellite signal D is 2, a delay time of the satellite signal E is 3, a DOP value of "the satellite signal A, the satellite signal B, the satellite signal C, the satellite signal D" is 7, and a DOP value of "the satellite signal A, the satellite signal B, the satellite signal C, the satellite signal E" is 4. Assuming that the cost value is "delay time×DOP value", a cost value of "the satellite signal A, the satellite signal B, the satellite signal C, the satellite signal D" is 2×7=14, and a cost value of "the satellite signal A, the satellite signal B, the satellite signal C, the satellite signal E" is 3×4=12, and thus, in this case, the satellite signal E is selected as the satellite signal to be added.

In addition, a premium for the satellite type may be set for the cost value. Here, a GNSS type indicates a type of a navigation satellite system such as GPS or GLONASS. For example, in a case where priority orders of satellites are set as illustrated in FIG. 9 to be described later, a smaller value is given as a premium of a cost value, as a priority order is higher (as a numerical value of a priority order is smaller).

For example, in the example of FIG. 9, a premium of priority order 1 is set as 5, a premium of priority order 2 is 4, a premium of priority order 3 is set as 3, a premium of priority order 4 is set as 2, and a premium of priority order 5 is set as 1.

In the example of the satellite signals D and E described above, assuming that a premium of the satellite signal D is 1 and a premium of the satellite signal E is 4, the cost value of "the satellite signal A, the satellite signal B, the satellite signal C, the satellite signal D" is 2×7+1=15, and the cost value of "the satellite signal A, the satellite signal B, the satellite signal C, the satellite signal E" is 3×4+4=16, and thus, in this case, the satellite signal D is selected as the satellite signal to be added.

In S3-3, the signal selection unit 130 determines whether or not the number of the satellite signals reaches the preset number ($N_1$), and repeats processing of S3-1 and S3-2 in a case where the number of the satellite signals does not reach the preset number ($N_1$). At a time of the repetition, processing is performed on a satellite signal, excluding the satellite signal already determined to be added.

In S3-3, in a case where the number of the satellite signals reaches the preset number ($N_1$), the calculation is ended, and for example, positioning and time synchronization using the selected satellite signal are performed.

Specific Example of Processing in Initial Estimated Position Determination Processing Hereinafter, as a specific example of the operation of the measurement device 100, a specific example of a procedure of the satellite signal selection in the above-described initial estimated position determination processing will be described.

In the following description of the specific example, elevation dependency and GNSS type and frequency band dependency are considered in normalization of the $C/N_0$ value. Here, the GNSS type indicates a type of a navigation satellite system such as GPS or GLONASS. A reason for considering the elevation dependency is that the smaller an elevation of a satellite, the longer a propagation path in the troposphere close to the ground surface, and satellite signals tend to be more attenuated. A reason for considering the GNSS type dependency is that a signal frequency and transmission power differ depending on the GNSS type, and a difference occurs in the $C/N_0$ value. Moreover, even in the same GNSS type, a difference occurs in the $C/N_0$ value depending on a frequency band of a signal (in a case of GPS, the L1 band, the L2 band, the L5 band, or the like). Note that either the elevation dependency or the GNSS type and frequency band dependency may be considered.

Hereinafter, the first embodiment and the second embodiment will be described as specific examples of the procedure of the satellite selection in the initial estimated position determination processing. In the second embodiment, portions different from those of the first embodiment will be mainly described.

First Embodiment

Example of Operation of Signal Selection Unit 130 of First Embodiment

Next, an example of an operation of the signal selection unit 130 in the first embodiment will be described in detail along a procedure of a flowchart illustrated in FIG. 5. In the description of the procedure, reference is also made to FIGS. 6 to 9.

First, setting parameters used in the procedure will be described with reference to FIG. 6. As illustrated in FIG. 6, $CN_{0max}$ is the maximum value of $C/N_0$ values of all received satellite signals in the L1 band. $dCN_0$ is a parameter that determines a range of the satellite signal selection, and is specifically the maximum value of differences between the maximum value of the $C/N_0$ values of the received satellite signals and the $C/N_0$ values of the satellite signals selected in the initial estimated position processing. $N_0$ is the number of the selected satellite signals, and specifically is the minimum number of the satellite signals selected in the initial estimated position determination processing. Note that, in the first embodiment, reception is performed in the L1 band, but performing reception in the L1 band is an example.

Figure 5:
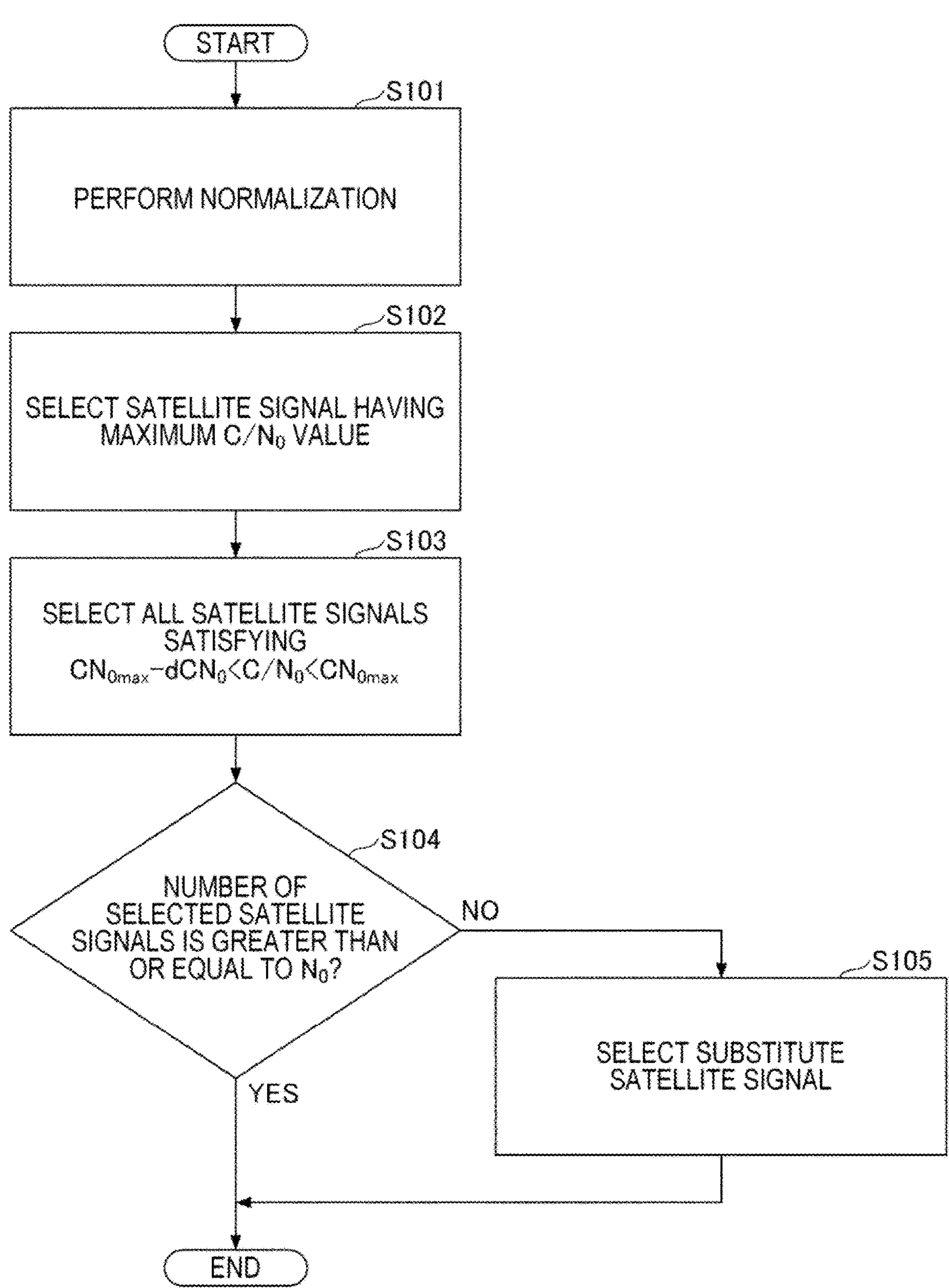
FIG. 5 is a diagram illustrating an example of a processing procedure regarding satellite signal selection.

In S101 of FIG. 5, the signal selection unit 130 normalizes the $C/N_0$ values of all satellite signals received in the L1 band in consideration of the GNSS type and the elevation dependency. Specifically, normalization is performed by adding a GNSS bias value and an elevation bias value preset by the bias value setting unit 170 to the $C/N_0$ values obtained by observation.

FIG. 7 illustrates an example of settings of the GNSS bias values, and FIG. 8 illustrates an example of setting of the elevation bias values. These bias values are stored in the bias value storage unit 180.

For example, assuming that a $C/N_0$ value obtained by observing a certain satellite signal is 30 dB-Hz, an elevation is 30°, and a satellite type is GLO (GLONASS), the signal selection unit 130 sets the $C/N_0$ value after correction (after normalization) of the satellite signal as 30+4+2=36 dB-Hz. Hereinafter, the $C/N_0$ value indicates a $C/N_0$ value after normalization.

In S102 of FIG. 5, the signal selection unit 130 selects a satellite signal having the maximum $C/N_0$ value from all the satellite signals received in the L1 band, and records the $C/N_0$ value as $CN_{0max}$. Note that, here, it is assumed that there is at least one visible satellite signal as a precondition.

In S103, the signal selection unit 130 sets a value smaller than $CN_{0max}$ by $dCN_0$ (for example, 10 dB) as a lower limit of C/N, with respect to the $C/N_0$ value ($C/N_0$) of the satellite signal selected in S102, and selects a satellite signal satisfying a condition from the received satellite signals. That is, the signal selection unit 130 selects all satellite signals having $C/N_0$ values that satisfy $CN_{0max}-dCN_0<C/N_0<CN_{0max}$ from all the satellite signals received in the L1 band.

In S104, the signal selection unit 130 determines whether or not the number of the satellite signals selected in S102 and S103 is greater than or equal to a preset minimum number of the selected satellite signals ($N_0$). In a case where a determination result in S104 is Yes, the signal selection processing by the signal selection unit 130 is ended. The signal selection unit 130 notifies the measurement unit 140 of identification information (codes such as the PRN numbers) on the selected satellite signals, so that the measurement unit 140 can perform positioning and time synchronization by using the selected satellite signals.

In a case where the determination result in S104 is No, that is, in a case where the number of the satellite signals selected in S102 and S103 is less than the preset minimum number of the selected satellite signals ($N_0$), the processing proceeds to S105.

In S105, the signal selection unit 130 selects a satellite signal in order from a satellite signal of which the $C/N_0$ value is less than or equal to "$CN_{0max}-dCN_0$" and the $C/N_0$ value is the second largest based on the preset priority orders of GNSS types, to perform supplementation so that the total number of the selected satellite signals reaches $N_0$.

FIG. 9 illustrates an example of settings of the priority orders of GNSS types. Setting values of the priority orders of GNSS types are also stored in the bias value storage unit 180, and the signal selection unit 130 refers to the setting values stored in the bias value storage unit 180. FIG. 9 illustrates that GPS has the highest priority order and GLO (GLONASS) has the lowest priority.

Here, selection based on the priority orders of GNSS types will be described. For each of types of GNSS satellites, there is a difference (clock bias) in time accuracy based on the absolute time of a clock by which the satellite is operated. When a substitute satellite signal is selected in S105, the substitute satellite signal is selected in consideration of reliability of GNSS including the clock bias.

For example, GPS and QZSS are completely synchronized in time as navigation satellite systems and the clock bias is small, and thus can be classified as category 1, Galileo can be classified as category 2, and GLONASS and BeiDou can be classified as category 3. Based on such category classification, the priority orders as illustrated in FIG. 9 are set.

As a method for selecting a substitute satellite signal in consideration of the priority order based on the reliability as described above, for example, there is a method for setting premiums (values to be added, the unit is dB) to the $C/N_0$ values depending on the priority order (or category of the reliability) and selecting a required number of satellite signals sequentially from a satellite signal whose $C/N_0$ value is the highest value.

For example, in the example of FIG. 9, the premium of priority order 1 is set as 5, the premium of priority order 2 is set as 4, the premium of priority order 3 is set as 3, the premium of priority order 4 is set as 2, and the premium of priority order 5 is set as 1.

As an example, it is assumed that the $N_0$ is 5, and three satellite signals are selected in S102 and S103. Furthermore, assuming that there are a satellite signal 1 ($C/N_0$ value=26 dB-Hz, premium=1), a satellite signal 2 ($C/N_0$ value=25 dB-Hz, premium=3), and a satellite signal 3 ($C/N_0$ value=24 dB-Hz, premium=5) as satellite signals having $C/N_0$ values less than or equal to "$CN_{0max}-dCN_0$", in S105, the signal selection unit 130 selects the satellite signal 3 and the satellite signal 2 whose $C/N_0$ values to which premiums are added are 29 dB-Hz and 28 dB-Hz.

Operation Example Regarding Bias Value Setting

Figure 10:
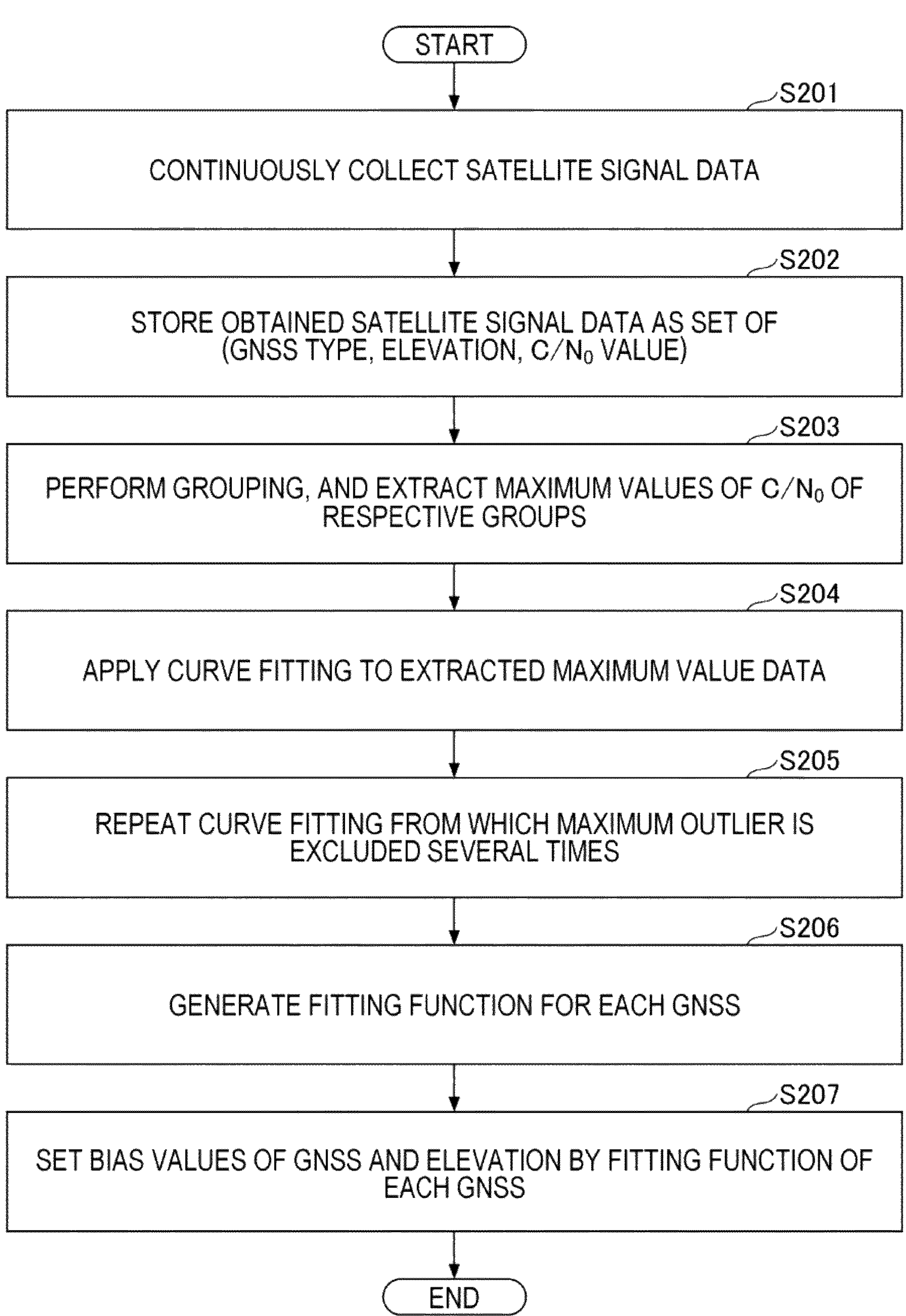
FIG. 10 is a diagram illustrating a processing procedure regarding settings of bias values.

Next, an example of an operation for setting bias values will be described in detail along a procedure of a flowchart illustrated in FIG. 10. In the description of the procedure, reference is also made to FIGS. 11 to 13.

In S201, the signal reception unit 120 continuously collects satellite signal data. Regarding a collection time length, in a case of an open sky environment, collecting data continuously for 24 hours is sufficient. In other reception environments, continuous collection for a longer time is required. The data may be collected at any time and the bias values may be updated.

In S202, the collected satellite signal data is stored in the signal data storage unit 160 as a set of (a GNSS type, an elevation, and a $C/N_0$ value).

In S203, for data of the same GNSS type, the bias value setting unit 170 groups the data by a range of the elevation based on the satellite signal data stored in the signal data storage unit 160, and extracts maximum values of the $C/N_0$ values of respective groups.

Figure 11:
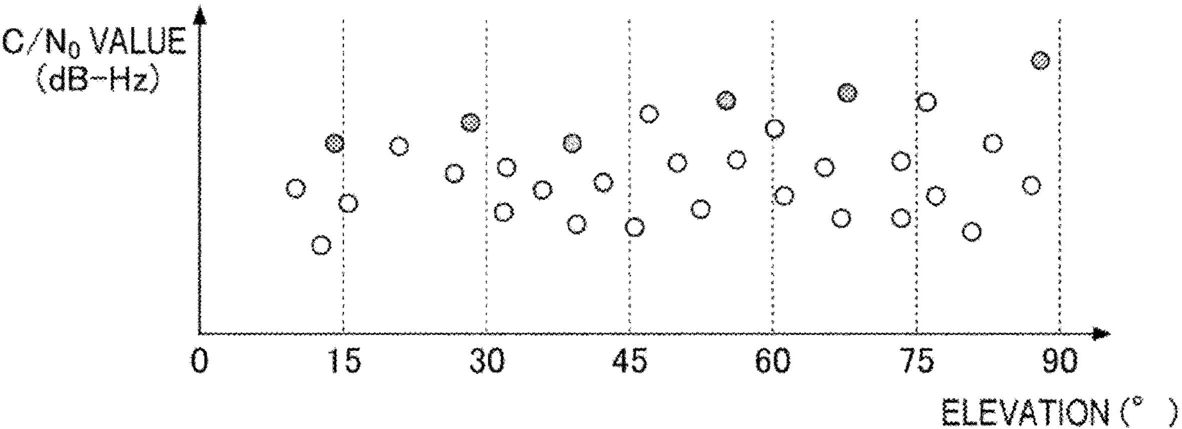
FIG. 11 is a diagram illustrating maximum values of $C/N_0$ values of respective groups.

FIG. 11 illustrates an example of processing of S203 in a certain GNSS type. In the example of FIG. 11, the elevations are grouped into 0° to 15°, 15° to 30°, 30° to 45°, 45° to 60°, 60° to 75°, and 75° to 90°, and the maximum values of the $C/N_0$ values of the respective groups are extracted.

Figure 12:
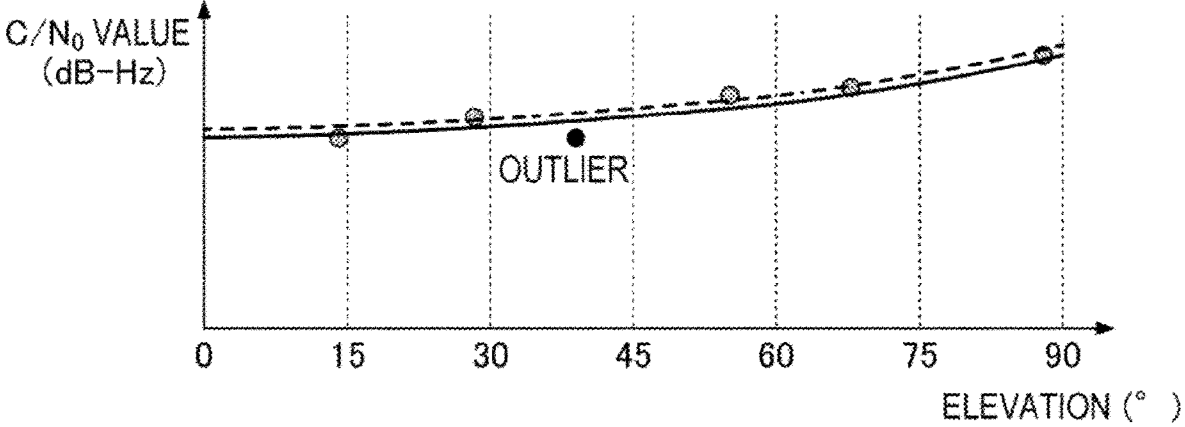
FIG. 12 is a diagram illustrating an example of curve fitting.

In S204, the bias value setting unit 170 applies curve fitting to the extracted maximum value data by, for example, a nonlinear least squares method. In S205, the bias value setting unit 170 repeats curve fitting, excluding a maximum outlier, several times. FIG. 12 illustrates an example of S204 and S205 for the GNSS type illustrated in FIG. 11.

Figure 13:
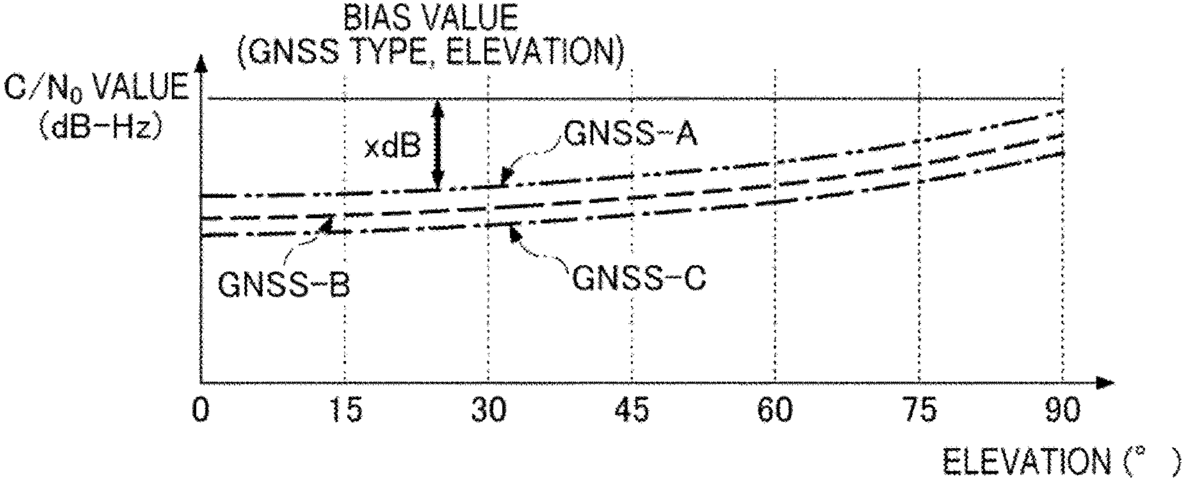
FIG. 13 is a diagram illustrating an example of bias value setting.

In S206, the bias value setting unit 170 generates fitting functions for respective GNSS types, and in S207, sets bias values of the GNSS types and the elevations by the fitting functions of the respective GNSS types. FIG. 13 illustrates an example of S206 and S207. As illustrated in FIG. 13, in any GNSS type, a larger bias value is set as the elevation is smaller. Furthermore, in the example of FIG. 13, among GNSS types, bias values in the order of GNSS-C>GNSS-B>GNSS-A are set.

Setting Value of $dCN_0$

Next, a setting value of $dCN_0$ (referred to as a $dCN_0$ value) will be described. As described in S103 of FIG. 5, the $dCN_0$ value is a parameter by which a range of $C/N_0$ values for selecting satellite signals is determined. Although the $dCN_0$ value may be a fixed value that does not depend on the elevation of the satellite signal, an example will be described below in which the $dCN_0$ value is determined depending on the elevation of the satellite signal. The example described here is an example in which a case is assumed where a reflection surface of a satellite signal is a vertical wall surface (concrete or glass) of a building as in an urban area.

Figure 14:
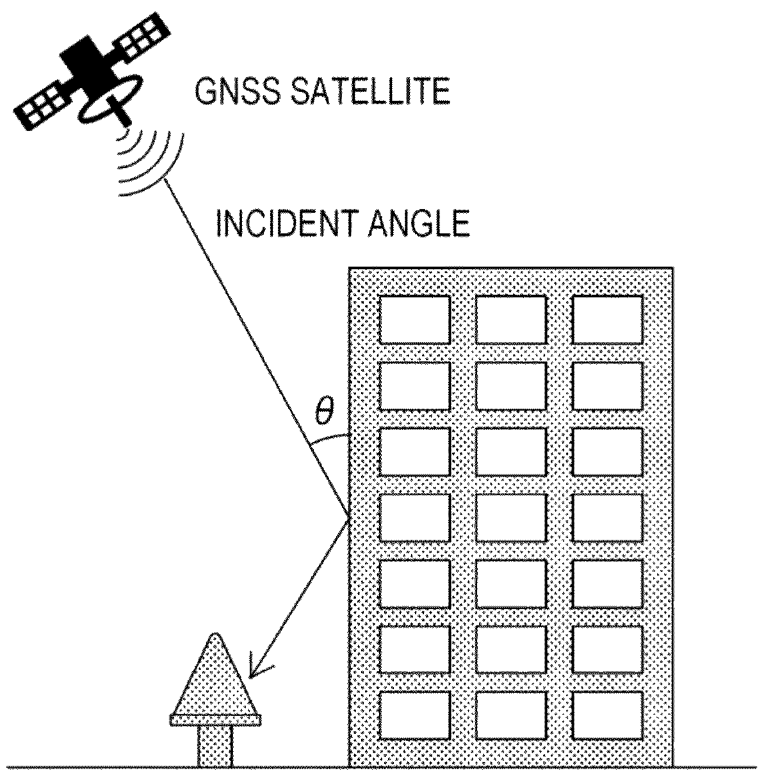
FIG. 14 is a diagram illustrating a state in which a satellite signal is incident on a wall surface of a building and reflected from the wall surface.
Figure 15:
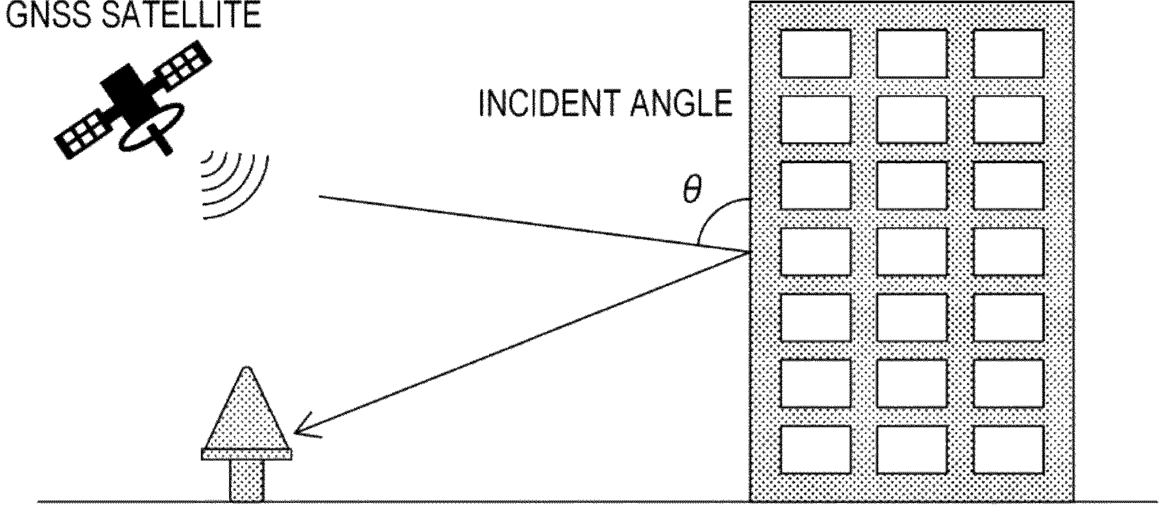
FIG. 15 is a diagram illustrating a state in which a satellite signal is incident on a wall surface of a building and reflected from the wall surface.

FIG. 14 illustrates a state in which a satellite signal having a high elevation is incident on and reflected by a vertical wall surface of a building, and FIG. 15 illustrates a state in which a satellite signal having a low elevation is incident on and reflected by a vertical wall surface of a building. As illustrated in FIGS. 14 and 15, an incident angle at which the satellite signal having a low elevation is incident on the vertical wall surface of the building is larger than an incident angle at which the satellite signal having a high elevation is incident on the vertical wall surface of the building.

Since reflectance of the satellite signal by the vertical wall surface of the building depends on the incident angle, the satellite signal having a low elevation is expected to have a relatively high reflectance (a signal intensity of a reflected wave is high) as compared with the satellite signal having a high elevation.

Figure 16:
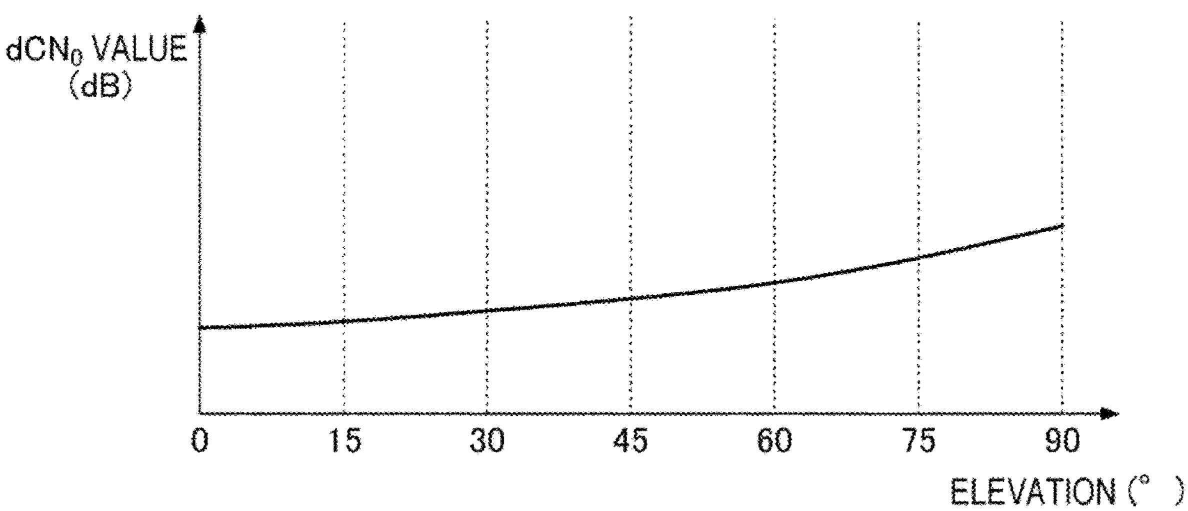
FIG. 16 is a diagram illustrating an example of a setting of a $dCN_0$ value that depends on an elevation.

Thus, giving elevation dependency to the $dCN_0$ value is effective in visible/invisible satellite selection. FIG. 16 illustrates an example of setting of the $dCN_0$ value in which the elevation dependency is given. As illustrated in FIG. 16, setting is performed such that the $dCN_0$ value also increases when the elevation of the satellite signal increases. A setting value having such elevation dependency may be stored, for example, in the bias value storage unit 180 in a form of a function corresponding to a curve in FIG. 16, or may be stored in the bias value storage unit 180 in a form of a table in which $dCN_0$ values for respective elevations (for example, in increments of) 5° are held.

When determining whether or not a $C/N_0$ value of a certain satellite signal satisfies "$CN_{0max}-dCN_0<C/N_0<CN_{0max}$" in S103 described above, the signal selection unit 130 refers to the bias value storage unit 180, acquires a $dCN_0$ value corresponding to the elevation of the satellite signal, and uses the $dCN_0$ value to determine whether or not "$CN_{0max}-dCN_0<C/N_0<CN_{0max}$" is satisfied.

Furthermore, in substitute satellite signal selection in S105 described above, when determining whether or not a $C/N_0$ value of a certain satellite signal is less than or equal to "$CN_{0max}-dCN_0$", the signal selection unit 130 refers to the bias value storage unit 180, acquires a $dCN_0$ value corresponding to the elevation of the satellite signal, and uses the $dCN_0$ value to determine whether or not the $C/N_0$ value is less than or equal to "$CN_{0max}-dCN_0$".

In determination of whether or not to select a satellite signal using "$CN_{0max}-dCN_0<C/N_0<CN_{0max}$", since the $dCN_0$ value of a satellite signal having a low elevation is smaller than that of a satellite signal having a high elevation, a range of "$CN_{0max}-dCN_0<C/N_0<CN_{0max}$" of the satellite signal having a low elevation is narrower than that of the satellite signal having a high elevation. That is, filtering is performed more strictly on the satellite signal having a low elevation than on the satellite signal having a high elevation. A reason why the elevation dependency is given to the $dCN_0$ value so that filtering is performed more strictly on the satellite signal having a low elevation than on the satellite signal having a high elevation will be described below.

Assuming that the reflection surface of the satellite signal is a vertical wall surface (concrete or glass) of a building in an urban area, a satellite signal having a low elevation is in a state close to total reflection, and a difference is small between a signal intensity of a reflected satellite signal and a signal intensity in a case where there is no obstacle and the satellite signal is received as a direct wave (the reference signal intensity normalized by the bias values of FIGS. 7 and 8)

That is, the satellite signal having a low elevation has a longer optical path length in a medium that attenuates signal intensity, such as the ionosphere or the troposphere, so the signal intensity decreases in a case where the satellite signal is received as a direct wave, but on the other hand, a decrease is small in the signal intensity at the time of reflection by the building, and thus it is necessary to reduce the $dCN_0$ value and strictly perform filtering to remove a multipath signal (reflected wave) of an invisible satellite signal. In a case of a high elevation satellite, on the contrary, the range of "$CN_{0max}-dCN_0<C/N_0<CN_{0max}$" is widened, and it is made easier to be selected.

Note that giving the elevation dependency so that the $dCN_0$ value also increases when the elevation of the satellite signal increases is an example. Depending on the environment, elevation dependency different from the above may be given to the $dCN_0$ value.

Note that it is conceivable to perform satellite selection in units of satellite types, but this is not performed. A reason thereof is as follows.

The technology according to the present invention is based on a premise that there is at least one visible satellite. In a case where satellite selection is performed in units of satellite types, a reference $C/N_0$ value ($CN_{0max}$) is an inappropriate value in a case where there is no visible satellite in a certain satellite type, and there is a possibility that accuracy of satellite selection deteriorates. In a case where all satellite types are targeted as in the first and second embodiments, a probability is improved that there is at least one visible satellite.

Second Embodiment

Next, the second embodiment will be described. The second embodiment is different from the first embodiment in that the measurement device 100 performs satellite signal selection for each of frequency bands. That is, in the first embodiment, satellite signal selection is performed only for the L1 band as an example, but in the second embodiment, satellite signals are selected for each of a plurality of frequency bands output from respective satellites.

Note that an effect of the invention can be exhibited by the technology described in the first embodiment. The second embodiment is a variation of the embodiments of the invention. In the second embodiment, a reason for performing satellite signal selection for each frequency band is as follows.

Since each satellite outputs signals of the plurality of frequency bands, from a viewpoint of selecting satellites suitable for positioning according to positions (visible/invisible) of the satellites, if it is possible to correctly determine that the satellites are visible/invisible by satellite signals of any one frequency band, it is not necessary to perform satellite selection with signals of each of the plurality of frequency bands.

However, in practice, it is not guaranteed that the satellites can be determined as visible/invisible with 100% accuracy. Furthermore, there is a possibility that reception characteristics of an antenna receiver and a mixed state of an interference signal are different for each frequency band, and there is a possibility that a combination of satellite signals more suitable for positioning calculation is selected by performing satellite signal selection in each of the plurality of frequency bands.

In the positioning calculation, different satellite signals can be used for respective frequency bands. Since frequency bands supported by satellites are different (for example, the L5 frequency band of GPS is supported by only some satellites), by individually selecting satellite signals for respective frequency bands, it is possible to widen a variation of policy setting for positioning calculation (such as changing an No value for each frequency band).

A device configuration of the measurement device 100 in the second embodiment is the same as the device configuration in the first embodiment, and is as illustrated in FIG. 1. The operation of each unit is basically the same as that of the first embodiment, but is different from that of the first embodiment in that an operation for performing satellite signal selection is performed for each frequency band.

That is, for each frequency band, the signal reception unit 120 sends identification information (a code such as the PRN number) on the received satellite signal, the elevation, the $C/N_0$ value, and the satellite type of the satellite signal to the signal selection unit 130. Furthermore, for each frequency band, the signal reception unit 120 stores the identification information, the elevation, the $C/N_0$ value, and the satellite type for each of received satellite signals in the signal data storage unit 160. In the present embodiment, the L1 band and the L2 band are targeted as the plurality of frequency bands. However, use of the L1 band and the L2 band is an example, and in addition to these, the L5 band may be used, or a frequency band other than the L1 band, the L2 band, and the L5 band may be used.

Example of Operation of Signal Selection Unit 130 in Second Embodiment

Figure 17:
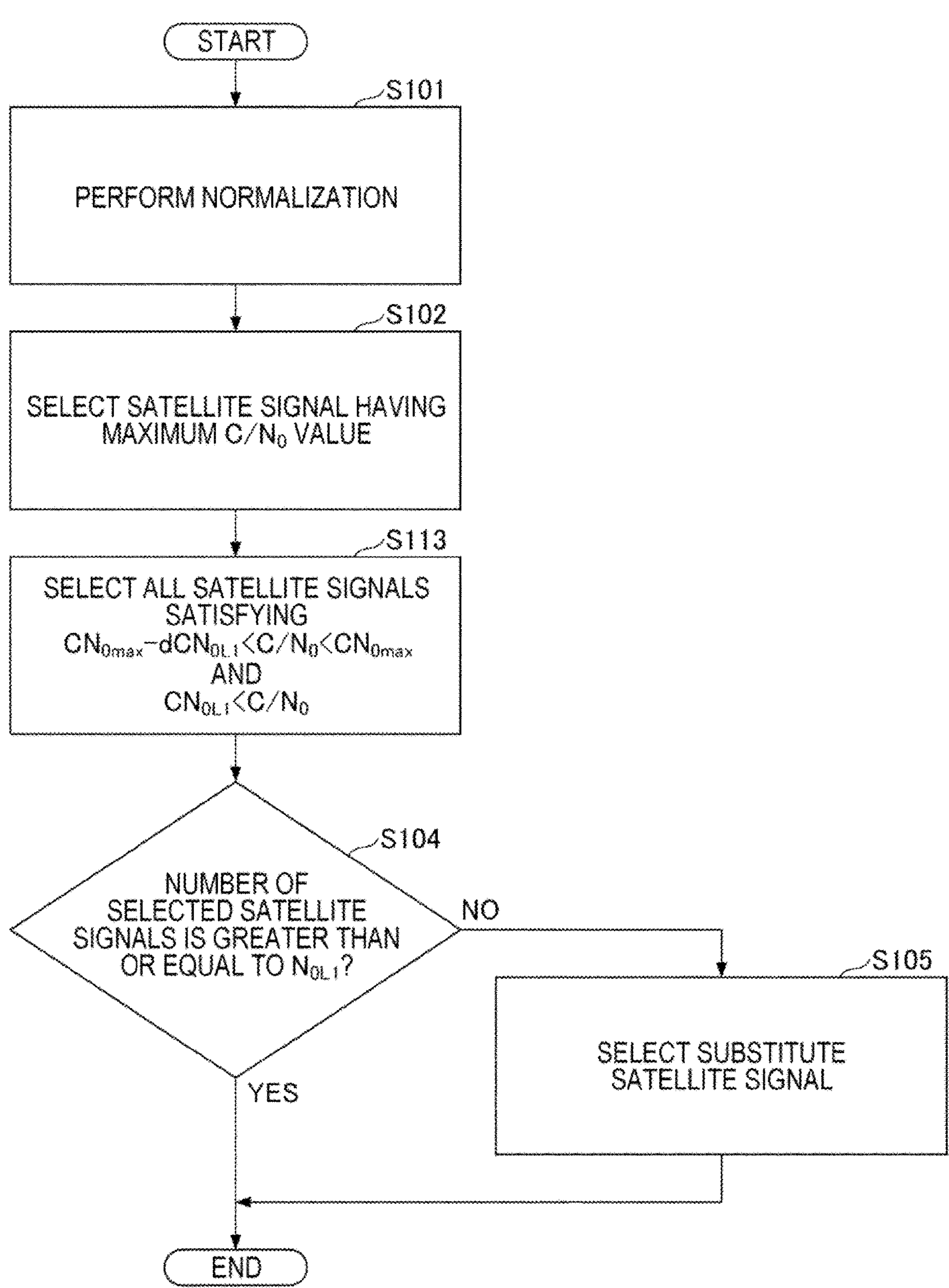
FIG. 17 is a diagram illustrating an example of a processing procedure regarding satellite signal selection.

Next, an example of the operation of the signal selection unit 130 in the second embodiment will be described. FIG. 17 is a flowchart illustrating the operation of the signal selection unit 130. A flow is basically the same as the flow in the first embodiment illustrated in FIG. 5, but the second embodiment is different from the first embodiment in that the flow in FIG. 17 is repeated for each frequency band, and determination of whether or not a minimum C/$N_0$ value in a frequency band being processed is satisfied is performed in S113 (corresponding to S103 in FIG. 5). Note that FIG. 17 illustrates processing for the L1 band in repetition for each frequency band as an example.

First, setting parameters used in a procedure in the second embodiment will be described with reference to FIG. 18. As illustrated in FIG. 18, $CN_{0L1}$ is the minimum C/$N_0$ value of selected satellites in the L1 band. $dCN_{0L1}$ is a parameter (corresponding to $dCN_0$ (described above) that determines a range of satellite signal selection in the L1 band. Now is the number of selected satellite signals in the L1 band. Similar parameters are set for the L2 band. Note that, in a case where other frequency bands are used, parameters may be set for each of the frequency bands. For example, if the 15 band is used, $CN_{0L5}$ and the like are set.

First, processing of the flow of FIG. 17 is executed for the L1 band. Processing of S101 and S102 is the same as that of the first embodiment. However, in the second embodiment, bias values as illustrated in FIGS. 7 and 8 are set for each frequency band, and in the normalization processing of S101, normalization is performed using bias values corresponding to a frequency band being processed. In S102, a satellite signal having the maximum C/$N_0$ value is selected from all satellite signals received in the frequency band (the L1 band at first), and records the C/$N_0$ value as $CN_{0max}$.

In S113, the signal selection unit 130 sets a value smaller than $CN_{0max}$ by $dCN_{0L1}$ (for example, 10 dB) as a lower limit of C/$N_0$ with respect to the C/$N_0$ value ($CN_{0max}$) of the satellite signal selected in S102, and selects a satellite signal satisfying the condition from the received satellite signals. Here, the signal selection unit 130 selects all satellite signals having C/$N_0$ values that satisfy $CN_{0max}-dCN_{0L1}<C/N_0<CN_{0max}$ and $CN_{0L1}<C/N_0$ from all the satellite signals received in the L1 band.

In S104, the signal selection unit 130 determines whether or not the number of the satellite signals selected in S102 and S103 is greater than or equal to the preset minimum number of selected satellite signals ($N_{0L1}$). In a case where a determination result in S104 is Yes, the signal selection processing by the signal selection unit 130 for the L1 band is ended. The signal selection unit 130 notifies the measurement unit 140 of identification information (codes such as the PRN numbers) on the selected satellite signals, so that the measurement unit 140 can perform positioning and time synchronization by using the selected satellite signals.

The signal selection unit 130 executes the processing of the flow of FIG. 17 for the next frequency band (for example, the L2 band).

In a case where the determination result in S104 is No, that is, in a case where the number of the satellite signals selected in S102 and S103 is less than the preset minimum number of the selected satellite signals ($N_{0L1}$), the processing proceeds to S105.

Processing in S105 may be the same as the processing described in the first embodiment. That is, in S105, the signal selection unit 130 selects satellite signals in order from a satellite signal of which the C/$N_0$ value is less than or equal to "$CN_{0max}-dCN_{0L1}$" and the C/$N_0$ value is the second largest based on the preset priority orders of GNSS types (for example, FIG. 9), to perform supplementation so that the total number of the selected satellite signals reaches $N_{0L1}$.

Note that the setting of the priority orders as illustrated in FIG. 9 may be determined for each frequency band. In that case, the signal selection unit 130 performs satellite signal selection by using priority orders corresponding to the frequency band being processed.

Similarly to the first embodiment, as a method for selecting a substitute satellite signal in consideration of the priority order based on the reliability, it is possible to use a method for setting premiums (values to be added) to the C/$N_0$ values depending on the priority order (or category of the reliability) and selecting a required number of satellite signals sequentially from a satellite signal whose C/$N_0$ value is the highest value.

For example, in the example of FIG. 9, the premium of priority order 1 is set as 5, the premium of priority order 2 is set as 4, the premium of priority order 3 is set as 3, the premium of priority order 4 is set as 2, and the premium of priority order 5 is set as 1.

As an example, it is assumed that the $N_{0L1}$ is 5, and three satellite signals are selected in S102 and S103. Furthermore, assuming that there are a satellite signal 1 (C/$N_0$ value=26 dB-Hz, premium=1), a satellite signal 2 (C/$N_0$ value=25 dB-Hz, premium=3), and a satellite signal 3 (C/$N_0$ value=24 dB-Hz, premium=5) as satellite signals having C/$N_0$ values less than or equal to "$CN_{0max}-dCN_{0L1}$", in S105, the signal selection unit 130 selects the satellite signal 3 and the satellite signal 2 whose C/$N_0$ values to which premiums are added are 29 dB-Hz and 28 dB-Hz.

When S105 ends, the signal selection unit 130 notifies the measurement unit 140 of identification information (codes such as the PRN numbers) on the selected satellite signals, so that the measurement unit 140 can perform positioning and time synchronization by using the selected satellite signals.

The signal selection unit 130 executes the processing of the flow of FIG. 17 for the next frequency band (for example, the L2 band).

Note that, in the above example, positioning and time synchronization are performed by using selected satellite signals for each frequency band, but positioning and time synchronization using satellite signals of the plurality of frequency bands may be performed based on the satellite signals selected in a specific frequency band.

For example, in a case where satellite signals 1, 2, 3, and 4 are selected in the L1 band and satellite signals 5, 6, 7, and 8 are selected in the L2 band by execution of the flow of FIG. 17 for each of the L1 band and the L2 band, a dilution of precision (DOP) value of the satellite signals 1, 2, 3, and 4 is compared with a DOP value of the satellite signals 5, 6, 7, and 8, and satellite signals of a frequency band having a smaller DOP value are selected, and positioning and time synchronization using signals of the L1 band and the L2 band may be executed.

(Variation of Method for Selecting Substitute Satellite Signal)

In the first embodiment and the second embodiment, another example of the substitute satellite signal selection in S105 will be described. The signal selection unit 130 may select a substitute satellite signal in consideration of a DOP value. For example, the signal selection unit 130 selects satellite signals A, B, and C as substitute satellite signal possibilities in order from a satellite signal whose $C/N_0$ value is both less than or equal to "$CN_{0max}-dCN_0$" and the $C/N_0$ value is the second largest, calculates a DOP value in a case where each of the substitute satellite possibilities A, B, and C is added to already selected satellite signals, and selects satellite signals having the minimum DOP value.

For example, assuming that the satellite signals already selected at a point of time of S104 are satellite signals 1, 2, and 3, a DOP value of each of "satellite signals 1, 2, 3, A", "satellite signals 1, 2, 3, B", and "satellite signals 1, 2, 3, C" is calculated. If the DOP value of "satellite signals 1, 2, 3, A" is the smallest, "satellite signals 1, 2, 3, A" are selected. In a case where the number of the satellites to be selected is greater than four, it is only required to repeat the above processing until the number of the satellites is reached.

Here, the method for selecting a substitute satellite signal described in the first embodiment is referred to as a selection method 1, and the above method in which a DOP value is used is referred to as a selection method 2. The signal selection unit 130 may select a substitute satellite signal by a combination of selection methods 1 and 2.

As an example of the combination, substitute satellite signals are selected by the selection method 1, the selection method 2 is performed with each of the selected satellite signals, and a satellite signal that makes a smaller DOP value is selected.

Furthermore, for example, a cost value (evaluation value) may be set with a degree of improvement in positioning accuracy by satellite signals selected based on the selection methods 1 and 2 as an expected value, and a satellite signal having a minimum total cost value (evaluation value) of the selection methods 1 and 2 may be selected as a substitute satellite signal. For example, it is assumed that the satellite signal A and the satellite signal B are selected as substitute satellite signal possibilities by the combination of the selection methods 1 and 2. For example, it is assumed that a $C/N_0$ value of the satellite signal A is 30 GB-Hz, a $C/N_0$ value of the satellite signal B is 28 dB-Hz, a DOP value in a case where the satellite signal A is selected is 5, and a DOP value in a case where the satellite signal B is selected is 4. In a case where the total cost value (evaluation value) of the selection methods 1 and 2 is set as "DOP value/($C/N_0$ value)", cost values of the satellite signals A and B are ⅙ and ⅐, respectively, and the cost value of the satellite signal B is smaller than the cost value of the satellite signal A, so that the satellite signal B is selected as the substitute satellite signal.

Operation Example Regarding Bias Value Setting

In the second embodiment, bias value setting operation executed by the bias value setting unit 170 is basically the same as the bias value setting operation in the first embodiment, but the second embodiment is different from the first embodiment in that bias values are set for each frequency band.

Figure 19:
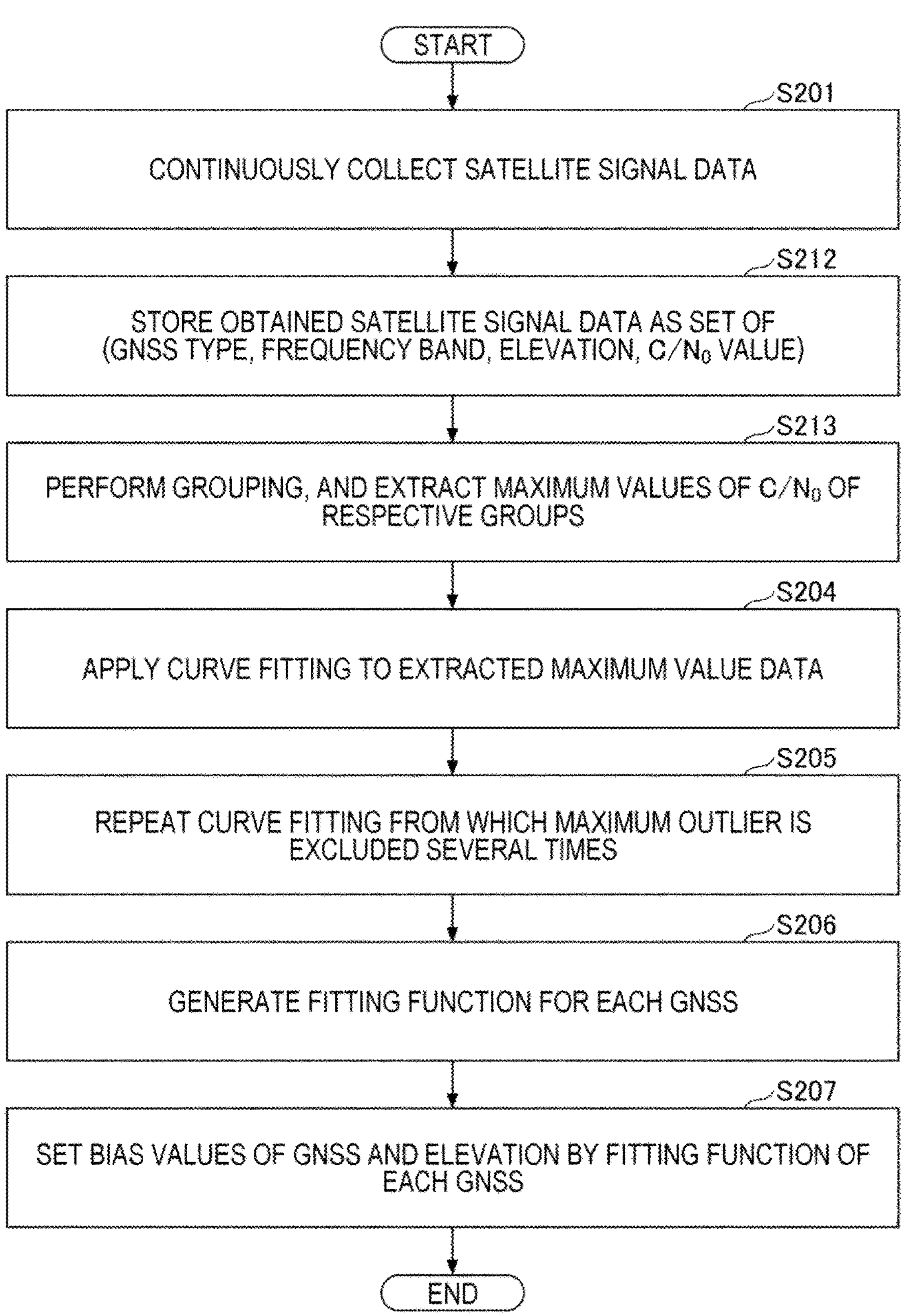
FIG. 19 is a diagram illustrating a processing procedure regarding settings of bias values.

FIG. 19 illustrates a flowchart of the bias value setting operation in the second embodiment. In S201, the signal reception unit 120 continuously collects satellite signal data for each frequency band.

In S212, the collected satellite signal data is stored in the signal data storage unit 160 as a set: (a GNSS type, a frequency band, an elevation, a $C/N_0$ value).

In S213, for data of the same GNSS type and frequency band, the bias value setting unit 170 groups the data by a range of the elevation based on the satellite signal data stored in the signal data storage unit 160, and extracts maximum values of the $C/N_0$ values of respective groups. Processing example thereof is as described with reference to FIG. 8.

In S204, the bias value setting unit 170 applies curve fitting to the extracted maximum value data by a nonlinear least squares method or the like. In S205, the bias value setting unit 170 repeats curve fitting, excluding a maximum outlier, several times. The example of S204 and S205 for the GNSS type illustrated in FIG. 11 is as illustrated in FIG. 12.

Figure 20:
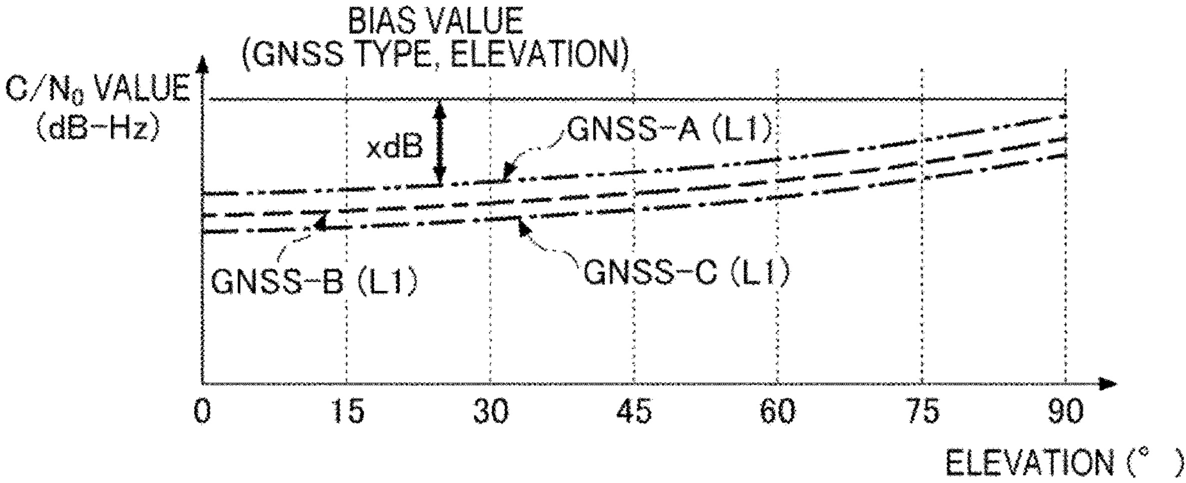
FIG. 20 is a diagram illustrating an example of the settings of the bias values.

In S206, the bias value setting unit 170 generates fitting functions for respective GNSS types, and in S207, sets bias values of GNSS types and elevations by the fitting functions of the respective GNSS types. FIG. 20 illustrates an example of S206 and S207 for the L1 band.

As described above, in the second embodiment, bias values are set for each frequency band of each satellite signal (for example, in the case of GPS, the L1 band, the L2 band, and the L5 band) for the GNSS satellite types. This is because the reception characteristic of the satellite signal depends on the frequency band of the satellite signal in addition to the GNSS satellite type and the elevation. Note that bias values based only on the GNSS satellite type and frequency band may be set without using the elevation.

Figure 21:
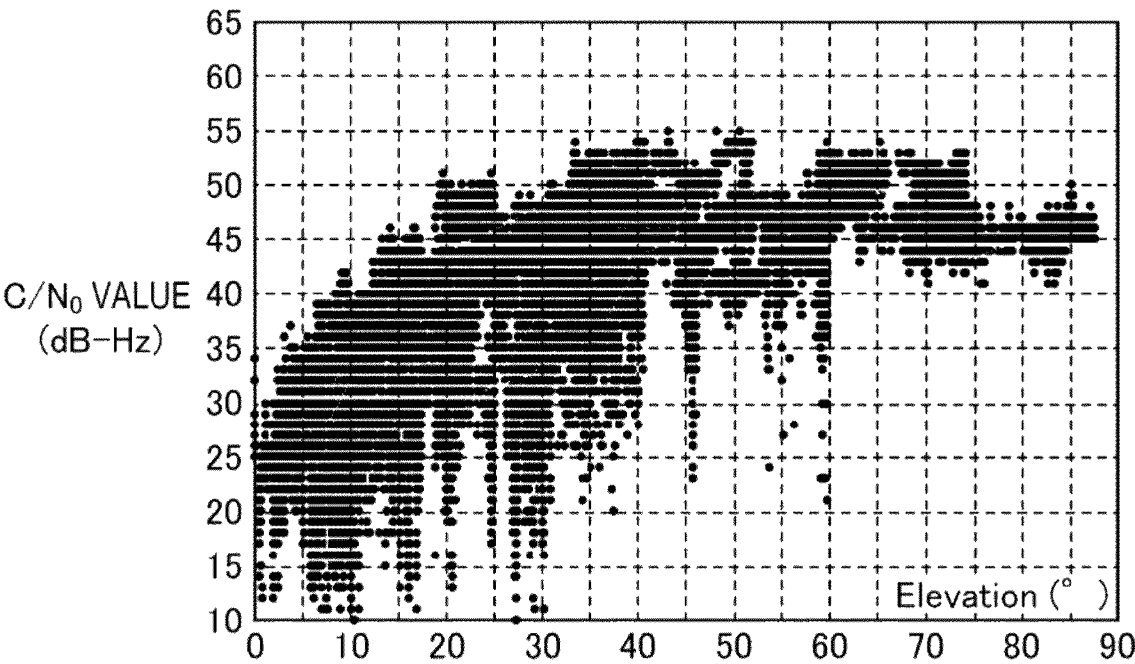
FIG. 21 is a diagram illustrating an actual measurement example of reception characteristics in the L1 band.
Figure 22:
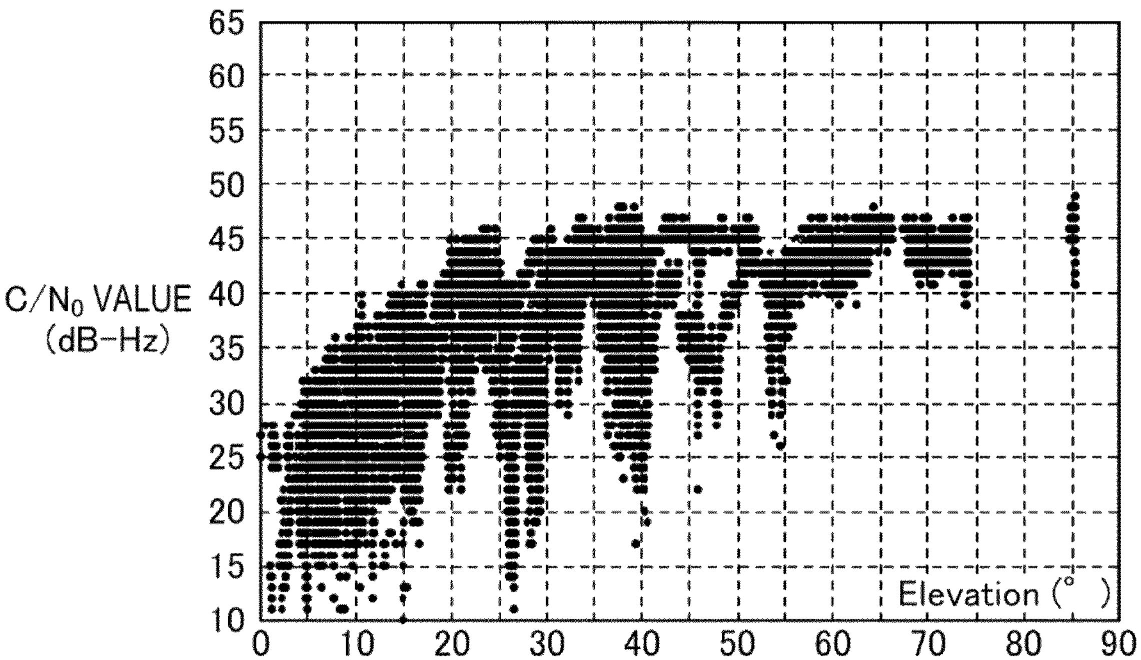
FIG. 22 is a diagram illustrating an actual measurement example of the reception characteristics in the L2 band.

FIGS. 21 and 22 illustrate actual measurement examples of a difference in reception characteristics depending on the frequency band for the same combination of a GNSS antenna and a GNSS receiver.

FIG. 21 illustrates an L1 signal of GPS, and FIG. 22 illustrates an L2 signal of GPS. In both FIGS. 21 and 22, the horizontal axis represents the elevation (°), and the vertical axis represents the $C/N_0$ value (dB-Hz).

(Variation Regarding Bias Value Setting)

Even in the same GNSS type, there are cases where transmission signal output varies depending on individual satellites. For example, the transmission signal output may vary depending on orbits of satellites (GEO/IGSO/MEO). In that case, bias values may be set for the individual satellites.

For example, in a case where a transmission signal intensity of the satellite A is smaller than a signal intensity of another satellite of the same GNSS type, a reception signal intensity decreases and the satellite signal may not be selected even in a case where the signal is received as a direct wave. In that case, correction is performed in which an individual bias value is added to the reception quality, for the satellite signal at the time of normalization. The individual bias value is applied in addition to the GNSS bias value and the elevation bias value illustrated in FIGS. 7 and 8. Alternatively, only the individual bias value may be applied to a satellite signal to which the individual bias value is to be applied, without application of the GNSS bias value and the elevation bias value. Alternatively, the elevation bias value and the individual bias value may be applied to a satellite signal to which the individual bias value is to be applied, without application of the GNSS bias value.

As to which satellite of which GNSS type the individual bias value is set, for example, the reception signal intensity is measured in advance for each GNSS type and each satellite, and measured values are stored in the signal data storage unit 160, and the bias value setting unit 170 selects a satellite in which an event similar to that of the satellite A described above occurs, and sets an individual bias value for the selected satellite.

Furthermore, an individual bias value for a specific satellite may be applied to a case other than the case regarding transmission signal output as in the satellite A described above.

(Setting Value of $dCN_0$)

Regarding the $dCN_0$ value (that is, a $dCN_{0L1}$ value, a $dCN_{0L2}$ value, and the like) for each frequency band in the second embodiment, as described with reference to FIGS. 14 and 15, the $dCN_0$ value to which the elevation dependency is given may be set. In this case, for example, the $dCN_0$ value to which the elevation dependency is given as illustrated in FIG. 16 is set for each frequency band.

(Operation in Case Where Number of Satellite Signals that can be Used for Positioning is Smaller Than Setting Value of Minimum Number of Satellite Signals)

To perform positioning and time synchronization by navigation satellite signals, it is necessary to receive at least four satellite signals. However, a case is assumed where the number of the satellite signals that can be used for positioning and time synchronization is significantly reduced due to a structure present around the reception position of the satellite signal, and the number of the satellite signals that can be used for positioning and time synchronization is less than the minimum number $N_0$ of the satellite signals selected in the initial estimated position determination processing, or less than the minimum number $N_1$ of the satellite signals selected in the substitute satellite selection processing. As the operation of the measurement device 100 in that case, for example, there are options of (1) not outputting a positioning solution and (2) outputting a positioning solution using a satellite signal that can be used. Which one of these operations is performed may be switched by setting in advance.

Example of Hardware Configuration

Figure 23:
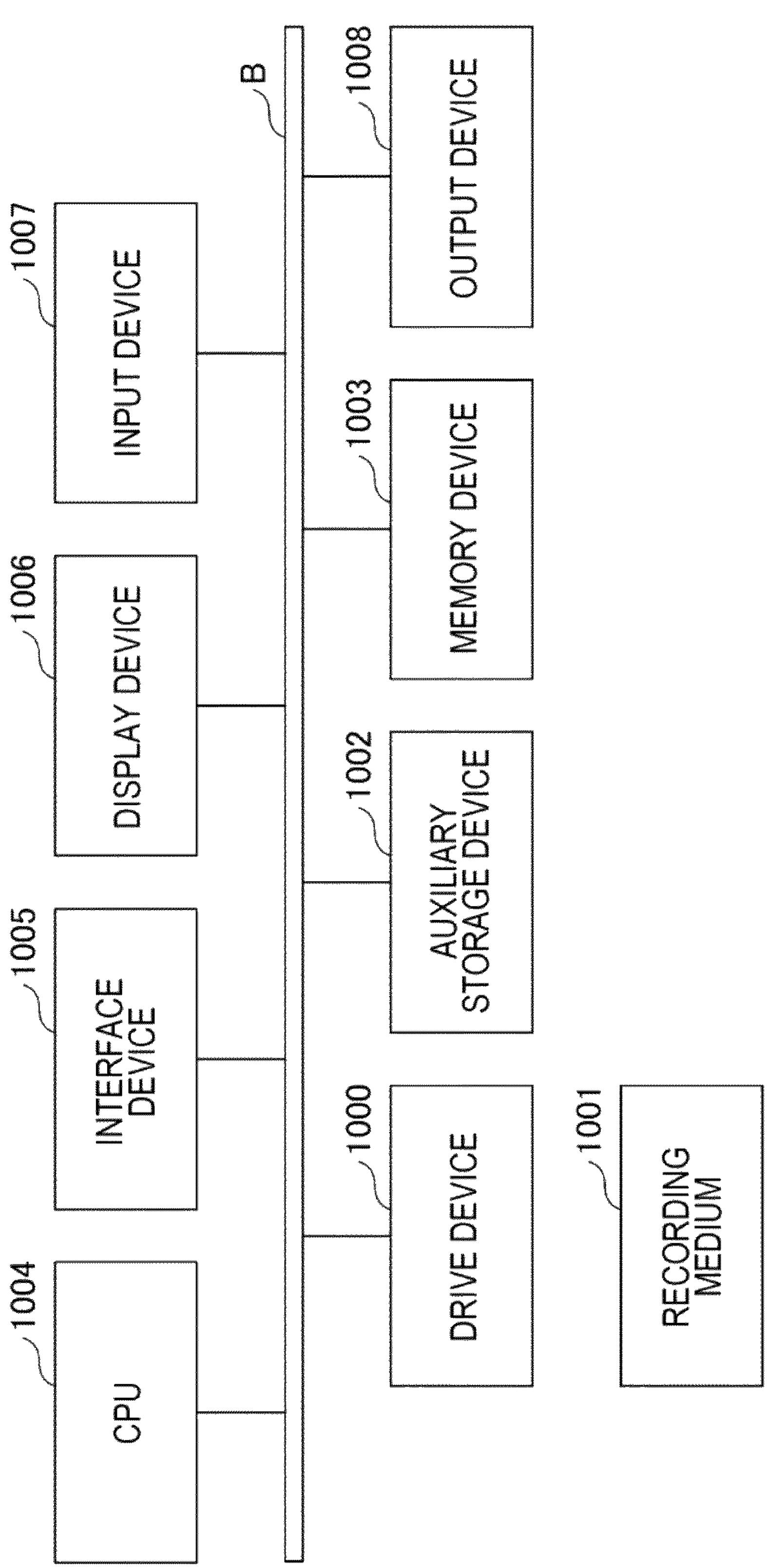
FIG. 23 is a diagram illustrating an example of a hardware configuration of a device.

FIG. 23 is a diagram illustrating an example of a hardware configuration of a computer that can be used as the measurement device 100 in the present embodiments. The computer may be a computer as a physical device or a virtual machine on a cloud.

The computer in FIG. 23 includes a drive device 1000, an auxiliary storage device 1002, a memory device 1003, a CPU 1004, an interface device 1005, a display device 1006, an input device 1007, an output device 1008, and the like, which are connected to each other by a bus B. Note that the GNSS antenna 110 is not illustrated in FIG. 20. The GNSS antenna 110 is connected to, for example, the interface device 1005.

A program for implementing processing in the computer is provided through a recording medium 1001 such as a CD-ROM or a memory card, for example. When the recording medium 1001 storing the program is set in the drive device 1000, the program is installed on the auxiliary storage device 1002 from the recording medium 1001 via the drive device 1000. However, the program is not necessarily installed from the recording medium 1001, and may be downloaded from another computer via a network. The auxiliary storage device 1002 stores the installed program, and also stores necessary files, data, and the like.

In a case where an instruction to start the program is given, the memory device 1003 reads the program from the auxiliary storage device 1002 and stores the program. The CPU 1004 achieves a function related to the measurement device 100 in accordance with the program stored in the memory device 1003. The interface device 1005 is used as an interface for connection to the GNSS antenna 110. The display device 1006 displays a graphical user interface (GUI) or the like by the program. The input device 1007 includes a keyboard and a mouse, buttons, a touchscreen, or the like, and is used to input various operation instructions. The output device 1008 outputs a calculation result.

Effects of Embodiments

As described above, according to the embodiments of the present invention, it is possible to select a visible satellite signal from received satellite signals with high accuracy without depending on characteristics of a receiver and an antenna. This can improve positioning accuracy in a reception environment that is not good. Furthermore, it is possible to reduce the influence of the interference signal in satellite selection.

Supplementary Notes

In the present embodiments, at least a measurement device, a measurement method, and a program described in the following clauses are provided.

Clause 1

A satellite signal reception apparatus including:

a signal selection unit that selects a predetermined number of satellite signals based on reception qualities of satellite signals received by a GNSS antenna; and a measurement unit that executes positioning by using the predetermined number of satellite signals selected by the signal selection unit and determines an initial estimated position, in which the signal selection unit selects a plurality of satellite signals to be used for positioning or time synchronization based on a comparison result obtained by comparing a reception time expected in a case where a satellite signal is received as a direct wave at the initial estimated position with an actual reception time of the satellite signal.

Clause 2

The satellite signal reception apparatus according to clause 1, in which the signal selection unit rejects a satellite signal actually received with a delay time greater than or equal to a threshold from the reception time expected in the case where the satellite signal is received as the direct wave at the initial estimated position based on the comparison result.

Clause 3

The satellite signal reception apparatus according to clause 2, in which the measurement unit performs positioning by using a plurality of satellite signals in which the rejected satellite signal is excluded, and updates the initial estimated position with an obtained coordinate value.

Clause 4

The satellite signal reception apparatus according to clause 3, in which the signal selection unit updates the initial estimated position, repeats processing based on the comparison result using the updated initial estimated position, and ends the repeated processing in a case where a predetermined end condition is satisfied.

Clause 5

The satellite signal reception apparatus according to clause 4, in which in a case where the number of satellite signals selected at a point of time at which the repeated processing ends is less than a preset number, the signal selection unit compares delay times with each other among a plurality of unselected satellite signals, and determines, based on a DOP value in a case where an unselected satellite signal having a small delay time is added to the selected satellite signals, the unselected satellite signal to be added to the selected satellite signals.

Clause 6

A satellite signal selection method executed by a satellite signal reception apparatus, the satellite signal selection method including:

a step of selecting a predetermined number of satellite signals based on reception qualities of satellite signals received by a GNSS antenna;

a step of executing positioning by using the predetermined number of satellite signals and determining an initial estimated position; and a step of selecting a plurality of satellite signals to be used for positioning or time synchronization based on a comparison result obtained by comparing a reception time expected in a case where a satellite signal is received as a direct wave at the initial estimated position with an actual reception time of the satellite signal.

Clause 7

A program for causing a computer to function as each unit in the satellite signal reception apparatus according to any one of clauses 1 to 5.

While the present embodiments have been described above, the present invention is not limited to such specific embodiments, and various modifications and changes can be made within the scope of the spirit of the present invention described in the claims.

The present patent application claims the priority based on International Patent Application PCT/JP2022/000721 filed on Jan. 12, 2022, and the entire contents of International Patent Application PCT/JP2022/000721 are incorporated herein by reference.

REFERENCE SIGNS LIST

100 Measurement device
110 GNSS antenna
120 Signal reception unit
130 Signal selection unit
140 Measurement unit
150 Output unit
160 Signal data storage unit
170 Bias value setting unit
180 Bias value storage unit
1000 Drive device
1001 Recording medium
1002 Auxiliary storage device
1003 Memory device
1004 CPU
1005 Interface device
1006 Display device
1007 Input device
1008 Output device

The invention claimed is:

1. A satellite signal reception apparatus comprising:

a processor; and a memory storing program instructions that cause the processor to:

select a predetermined number of satellite signals based on reception qualities of satellite signals received by a GNSS antenna; and execute positioning by using the predetermined number of selected satellite signals and determines an initial estimated position, wherein the program instructions cause the processor to select a plurality of satellite signals to be used for positioning or time synchronization based on a comparison result obtained by comparing a reception time expected in a case where a satellite signal is received as a direct wave at the initial estimated position with an actual reception time of the satellite signal.

2. The satellite signal reception apparatus according to claim 1, wherein the program instructions cause the processor to reject a satellite signal actually received with a delay time greater than or equal to a threshold from the reception time expected in the case where the satellite signal is received as the direct wave at the initial estimated position based on the comparison result.

3. The satellite signal reception apparatus according to claim 2, wherein the program instructions cause the processor to perform positioning by using a plurality of satellite signals in which the rejected satellite signal is excluded, and update the initial estimated position with an obtained coordinate value.

4. The satellite signal reception apparatus according to claim 3, wherein the program instructions cause the processor to update the initial estimated position, repeat processing based on the comparison result using the updated initial estimated position, and end the repeated processing in a case where a predetermined end condition is satisfied.

5. The satellite signal reception apparatus according to claim 4, wherein in a case where a number of satellite signals selected at a point of time at which the repeated processing ends is less than a preset number, the program instructions cause the processor to compare delay times with each other among a plurality of unselected satellite signals, and determine, based on a DOP value in a case where an unselected satellite signal having a small delay time is added to the selected satellite signals, the unselected satellite signal to be added to the selected satellite signals.

6. A satellite signal selection method executed by a satellite signal reception apparatus, the satellite signal selection method comprising:

selecting a predetermined number of satellite signals based on reception qualities of satellite signals received by a GNSS antenna;

executing positioning by using the predetermined number of satellite signals and determining an initial estimated position; and selecting a plurality of satellite signals to be used for positioning or time synchronization based on a comparison result obtained by comparing a reception time expected in a case where a satellite signal is received as a direct wave at the initial estimated position with an actual reception time of the satellite signal.

7. A non-transitory computer-readable recording medium having stored therein a program for causing a computer to perform the satellite signal selection method according to claim 6.

* * * * *